US008798784B1

(12) United States Patent
Clark et al.

(10) Patent No.: US 8,798,784 B1
(45) Date of Patent: Aug. 5, 2014

(54) ROBOTIC INDUCTION IN MATERIALS HANDLING FACILITIES WITH BATCH SINGULATION

(75) Inventors: David H. Clark, Seattle, WA (US); Eric Young, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 612 days.

(21) Appl. No.: 12/981,109

(22) Filed: Dec. 29, 2010

(51) Int. Cl.
*G06F 7/00* (2006.01)

(52) U.S. Cl.
USPC ...... 700/214; 414/276; 414/222.07; 198/431; 280/35

(58) Field of Classification Search
USPC ........................................................ 700/214
See application file for complete search history.

(56) References Cited

U.S. PATENT DOCUMENTS

| | | |
|---|---|---|
| 4,561,060 A | 12/1985 | Hemond |
| 5,246,332 A | 9/1993 | Bernard, II et al. |
| 5,301,790 A | 4/1994 | Prydtz et al. |
| 5,385,243 A | 1/1995 | Jackson et al. |
| 5,388,706 A | 2/1995 | Baldur |
| 5,934,413 A | 8/1999 | Konig et al. |
| 5,977,501 A | 11/1999 | Werkheiser et al. |
| 6,259,967 B1 | 7/2001 | Hartlepp et al. |
| 6,289,260 B1 | 9/2001 | Bradley et al. |
| 6,401,936 B1 | 6/2002 | Isaacs et al. |
| 6,484,886 B1 | 11/2002 | Isaacs et al. |
| 6,694,220 B1 | 2/2004 | Tanz |
| 6,748,292 B2 | 6/2004 | Mountz |
| 6,789,660 B1 | 9/2004 | Bruun et al. |
| 6,950,722 B2 | 9/2005 | Mountz |
| 7,055,741 B2 | 6/2006 | Bong et al. |
| 7,084,365 B2 | 8/2006 | Whitnable |
| 7,774,243 B1 | 8/2010 | Antony et al. |
| 7,991,505 B2 | 8/2011 | Lert, Jr. et al. |
| 8,170,711 B2 | 5/2012 | D'andrea et al. |

(Continued)

FOREIGN PATENT DOCUMENTS

EP 1693319 8/2006

OTHER PUBLICATIONS

U.S. Appl. No. 12/981,159, filed Dec. 29, 2010.
U.S. Appl. No. 12/981,125, filed Dec. 29, 2010.
U.S. Appl. No. 12/981,172, filed Dec. 29, 2010.
U.S. Appl. No. 11/768,529, filed Jun. 26, 2007.
U.S. Appl. No. 11/860,943, filed Sep. 25, 2007.

(Continued)

*Primary Examiner* — Gene Crawford
*Assistant Examiner* — Kyle Logan
(74) *Attorney, Agent, or Firm* — Robert C. Kowert; Meyertons, Hood, Kivlin, Kowert & Goetzel, P.C.

(57) ABSTRACT

Methods and apparatus for robotic induction in materials handling facilities with batch singulation inventory areas are disclosed. A control system directs the one or more robotic devices to transport a particular portable storage unit of a plurality of portable storage units to and from a particular induction station of one or more induction stations. The control system directs induction of one or more single units of items from one or more locations of the portable storage unit, while the particular portable storage unit is located at an induction station, into the conveyance mechanism at the particular induction station. The control system directs picks of batches of heterogeneous items from a separate inventory storage area. The control system directs induction of single units of items from the batches of heterogeneous items picked from the separate inventory storage area into the conveyance mechanism at a batch singulation station.

20 Claims, 12 Drawing Sheets

(56) References Cited

U.S. PATENT DOCUMENTS

| | | |
|---|---|---|
| 2004/0249497 A1 | 12/2004 | Saigh et al. |
| 2005/0067318 A1 | 3/2005 | Cesario |
| 2005/0149226 A1 | 7/2005 | Stevens et al. |
| 2006/0151288 A1 | 7/2006 | Reznik et al. |
| 2007/0021864 A1 | 1/2007 | Mountz |
| 2007/0209976 A1 | 9/2007 | Worth et al. |
| 2007/0246328 A1 | 10/2007 | Reznik et al. |
| 2007/0288123 A1 | 12/2007 | D'andrea et al. |
| 2008/0001372 A1* | 1/2008 | Hoffman et al. ............... 280/35 |
| 2008/0167884 A1 | 7/2008 | Mountz et al. |
| 2008/0167933 A1 | 7/2008 | Hoffman et al. |
| 2008/0207114 A1 | 8/2008 | Tuttle |
| 2009/0000912 A1* | 1/2009 | Battles et al. ............... 198/431 |
| 2009/0074545 A1* | 3/2009 | Lert et al. ............... 414/276 |
| 2009/0081008 A1* | 3/2009 | Somin et al. ............ 414/222.07 |

OTHER PUBLICATIONS

How Kiva Systems and Warehouse Management Systems Interact (Kiva Systems Tech Brief, 2010), 12 pages.

Hobkirk, I.; Shecterle, R. Scalability, Flexibility, Portability: Zappos Re-Writes the Rules for Warehouse Design (Aberdeen Group, May 2008), 4 pages.

Defying the Laws of Fulfillment: The Kiva Mobile Fulfillment System (Kiva Systems Brochure, 2007), 8 pages.

Brad Wyland. Warehouse Automation: How to Implement Tomorrow's Order Fulfillment System Today (Aberdeen Group, Oct. 2008), 27 pages.

Mick Mountz. Using Distribution and Fulfillment as Strategic Weapons. White paper (Inboundlogistics.com, Viewpoint, Jan. 2010), 6 pages.

* cited by examiner

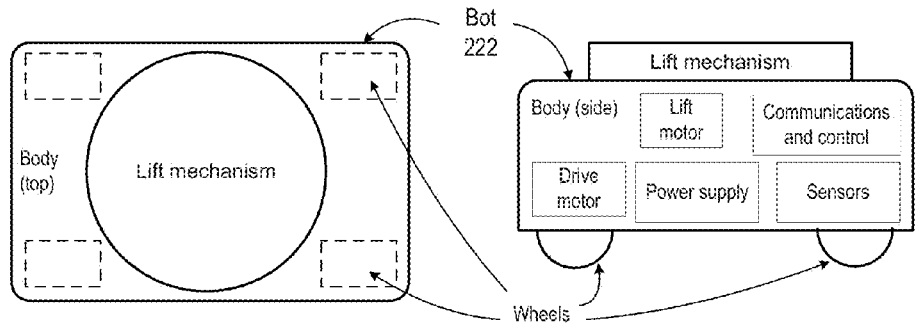
*Figure 5A*    *Figure 5B*
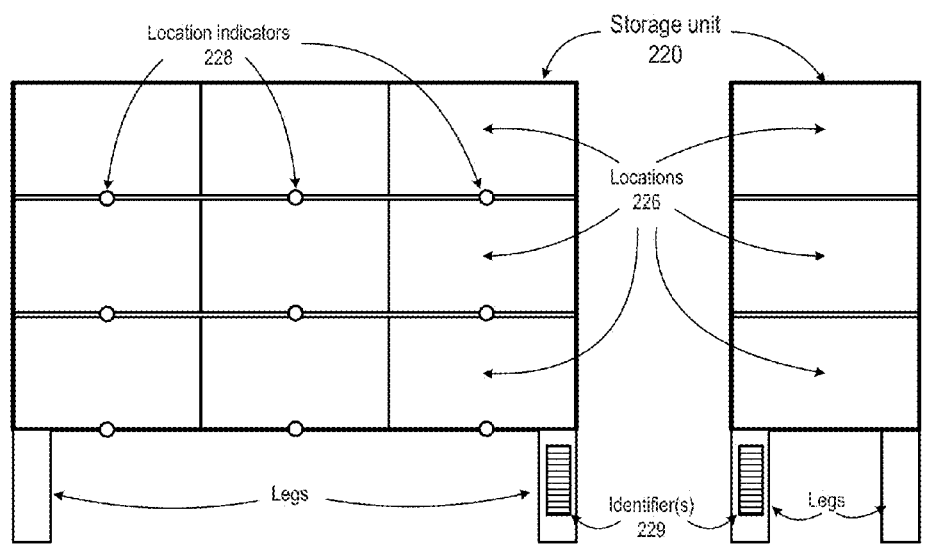
*Figure 6A*    *Figure 6B*
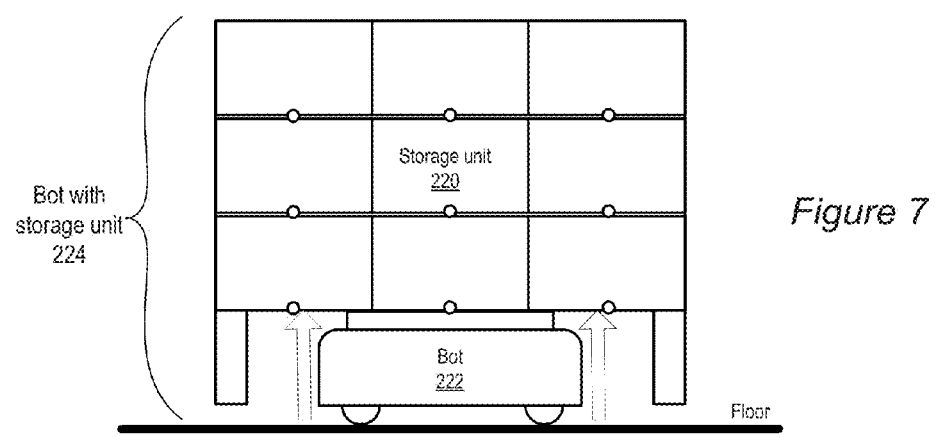
*Figure 7*

ROBOTIC INDUCTION IN MATERIALS HANDLING FACILITIES WITH BATCH SINGULATION

BACKGROUND

In a distribution system, a retailer or other product distributor (which may collectively be referred to as distributors) typically maintains an inventory of various items at one or more distribution centers, fulfillment centers, cross-docking facilities, materials handling facilities or warehouses (which may collectively be referred to as materials handling facilities). The inventory items are ordered from one or more vendors, received at the materials handling facilities as inbound shipments, and stocked in inventory of the materials handling facilities. In a conventional order fulfillment process, orders for items may be received from customers of the distributor. Units of the ordered items are picked from various locations in the inventory in the materials handling facilities, processed for shipping, and shipped as outbound shipments to the customers.

An example conventional order fulfillment process may include a pick process and a sortation process in which mixed batches of units picked for orders are sorted into their respective orders. In a conventional order fulfillment process, requests (e.g., orders) for items from requestors may be divided among multiple pickers, who then pick mixed batches of items. The orders may be subdivided among the pickers; therefore, two or more of the pickers may pick items for one order. Consequently, a sort operation to select the proper units of items for given orders from the aggregations of units items returned by each respective picker is required. Conventionally, sorting may be performed using automated sorting mechanisms or manual sorting systems. Automated sorting mechanisms for sorting certain types of inventory items according to individual orders include, but are not limited to, the Crisplant® sorter, Eurosort® sorters, and automated sorting mechanisms offered by other vendors. Using an automated sorting mechanism, batches or a stream of incoming picked items for multiple different customer orders are received at the automated sorting mechanism and sorted by the automated mechanism according to individual orders.

In typical automated sorting mechanisms, individual units of items are inducted from picked batches of mixed items directly onto the sortation mechanism into carriers (e.g., tilt trays) that are fixed to the sortation mechanism. Thus, typical automated sorting mechanisms that are used in materials handling facilities tend to be linear sorting systems. Linear sorting inducts or places individual units of items from picked batches of items (referred to as singulation) onto an individual tray or transport mechanism that is a fixed component of a linear piece of automated equipment. All of the trays or transport mechanisms are connected in a linear sequence (typically in a circle or oval continuously-running loop). An item is placed directly onto a carrier of the automated sorting mechanism. Linear sorting systems thus tend to be limited in velocity, total capacity, and the size and types of items that can be sorted.

Robotics in Order Fulfillment Systems

Order fulfillment systems exist in which mobile robotic devices are employed. In a conventional order fulfillment system that employs robotic devices, an order fulfillment center includes one or more workstations. An operator at each workstation is assigned a set of one or more orders to fulfill from inventory; typically, four to twenty orders are assigned to a workstation in a set. To fulfill the current set of orders at a given workstation, the mobile robotic devices pick up and deliver portable inventory storage units from a stock storage area to the work station, where the operator picks items from the storage unit and places the items into shipping boxes or slots assigned to particular orders in the current set. The mobile robotic devices deliver shelving units to the workstation until all of the orders in the current set of orders assigned to the work station are fulfilled from inventory. At that time, the fulfilled orders are moved from the workstation to downstream stations where the shipping boxes are sealed and shipped, and a new set of boxes or slots for a new set of orders is moved to the workstation to start the process over again.

The conventional order fulfillment system employing robotic devices described above is serialized; all inventory for a particular order has to come to a particular workstation that is assigned that order. In such conventional systems, the number of workstations required and therefore the capacity of the system is tied to how quickly (cycle time) all items for an order can be delivered to the workstation from the time an order is assigned to a particular workstation and the time the last item for the order is pulled from a storage units at the workstation. Thus, the delivery of inventory to a workstation quickly and without delay is critical to the success of the conventional system. Orders at a workstation may have to wait for fulfillment while needed inventory storage units are being delivered to and processed at one or more other workstations. This is particularly the case where a given storage unit may store many different types of items, as the likelihood that two or more workstations may need the same storage unit at the same time goes up as the number of types on the storage unit increases. Particular orders can be delayed waiting for inventory if the size of the inventory storage area is very large as inventory must travel to a specific workstation to be fulfilled regardless of distance traveled. To maintain efficiency, this conventional robotic order fulfillment system may require frequent tuning, for example by rearranging the distribution of items or storage units in inventory storage, in attempts to minimize the movements of the robotic devices and thus maximize throughput of the system. This optimization may be effective when few types of units are stored in inventory (e.g., thousands) and there are large quantities of each unit type (e.g., hundreds/thousands) but ineffective when many types of units (e.g., hundreds of thousands/millions) and few units (e.g., tens/hundreds) of each are stored. This large number of unit types with few units of inventory each increases the odds a storage unit could be required at any given workstation to fulfill an order. This lack of optimization creates longer cycle times which require more workstations which create more competing demands for inventory storage units which reduce cycle times and therefore creates a downward spiral of system throughput once this condition occurs. While this conventional robotic order fulfillment system may work well for single-floor, relatively small distribution centers (up to 100 k-200 k square feet) with relatively few types of items, the system is difficult to scale to larger distribution centers (200 k+ square feet), distribution centers with tens of thousands to millions of types of items, and multi-level distribution centers. In addition, this conventional robot-assisted order fulfillment system is an end-to-end order fulfillment solution, and is difficult to integrate with other materials handling techniques resulting in reduced flexibility and increased costs when supporting non-level system demand.

BRIEF DESCRIPTION OF THE DRAWINGS

FIGS. 5A and 5B illustrate an example mobile robotic device (bot) that may be used in at least some embodiments.

FIGS. 6A and 6B illustrate an example storage unit that may be used in at least some embodiments.

FIG. 7 illustrates an example bot with a storage unit, according to at least some embodiments.

Figure 1:
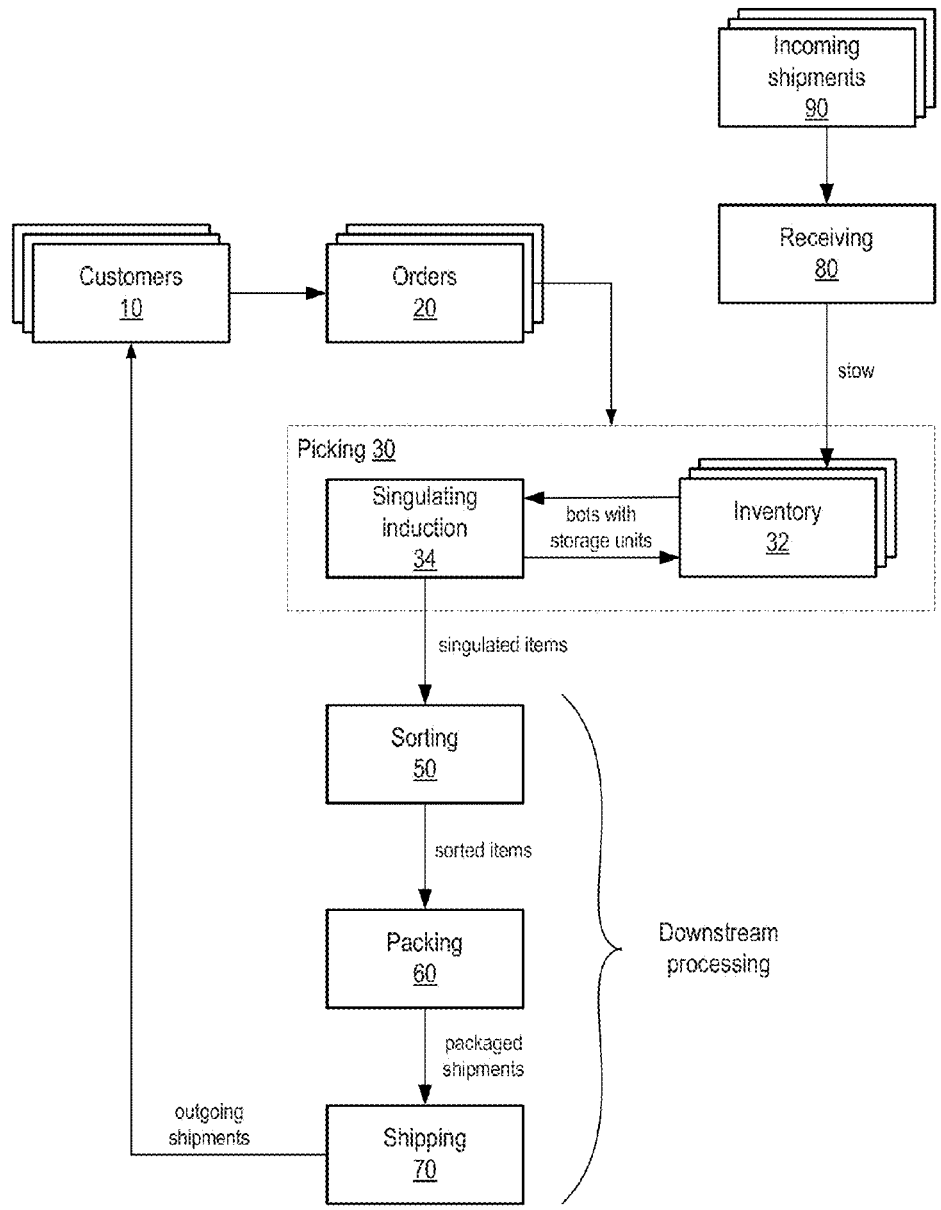
FIG. 1 shows a logical representation or view of the operation of a materials handling facility in which embodiments of methods and apparatus for robotic induction may be implemented.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for robotic induction in materials handling facility processes such as order fulfillment processes are described. In embodiments, one or more induction stations are located in an inventory area. The induction stations perform singulation and induction; that is, singulation of inventory into single units of items and induction of the units of items into a conveyance mechanism. The inventory area includes a stock storage area that contains a plurality of portable storage units, each storage unit including one or more locations for stowing inventory, with each location typically, but not necessarily, stowing one type of item. Mobile robotic devices (referred to herein as bots) are deployed to deliver particular storage units from the stock storage area to particular induction stations. At the induction stations, human or automated inductors perform singulation and induction of items from the storage units into a conveyance mechanism. To perform singulation and induction, the inductors remove single units of items from locations on the storage units and induct the single units of items into a conveyance mechanism. The conveyance mechanism delivers the single units of items to one or more downstream processing stations or devices, such as sorting stations or sorting devices. One or more units of items of one or more types of items for one or more customer orders may be singulated and inducted from a given storage unit at an induction station; when the station is done with a storage unit, the bot moves the storage unit from the induction station back to stock storage or to another induction station, and another bot moves a next storage unit to the induction station.

In some embodiments, to perform singulation and induction, the inductors remove single units of items from the storage units and place the single units of items into conveyance receptacles (induction). Only one unit is placed in each conveyance receptacle (singulation). The conveyance receptacles are on, or are inducted into, the conveyance mechanism, which delivers the conveyance receptacles, each including a single unit of an item to the one or more downstream processing stations or devices. In other embodiments, to perform singulation and induction, the inductors remove single units of items from the storage units and place the single units of items directly onto the conveyance mechanism (singulation and induction).

The operations of the bots, induction stations, conveyance mechanism, and downstream processing may be controlled and/or directed by a materials handling facility control system. In an order fulfillment process, the control system may receive orders, and direct the processing of items to fulfill the orders according to the robotic induction method described above. However, unlike the conventional order fulfillment system employing robotic devices described above in which workstations are assigned sets of orders to fulfill, the induction stations are not assigned particular orders. The control system does not assign a given order to a particular induction station; instead, the control system may direct bots to deliver storage units to two or more induction stations to fulfill a given order. Any item for any order can be singulated and inducted into the conveyance mechanism at any induction station. Thus, an order does not have to wait at a workstation for a particular type of item to be delivered to the station, as may be the case in the conventional system described above.

The method for robotic induction in a materials handling facility is scalable to handle the needs of larger materials handling facilities (200 k+ square feet), materials handling facilities with tens of thousands to millions of types of items, and multi-level materials handling facilities. A materials handling facility can be implemented that includes two or more inventory areas, for example an inventory area on each level of a multi-level facility, with each inventory area including one or more stock storage areas, one or more induction stations, and a set of bots that operate within the inventory area. In some implementations, an inventory area may be subdivided into zones, for example a zone of the stock storage area corresponding to (and nearby) each induction station, and one or more bots may be assigned to operate within each zone. Inventory areas and/or zones may be added, removed, consolidated, or subdivided to adapt to changes in demand. Types of items may be, but are not necessarily, distributed among two or more storage units in an inventory area so that the same type of item can be delivered to two or more induction stations at the same time. In addition, types of items may be, but are not necessarily, distributed among two or more different inventory areas. A conveyance mechanism or mechanisms may serve each inventory area and zone; the conveyance mechanisms may merge outside the inventory areas for consolidated downstream processing, or may deliver the singulated items from different inventory areas to different downstream processing locations. The control system may direct, control, and coordinate the order fulfillment process across the two or more inventory areas, two or more conveyance mechanisms, and the two or more downstream processing locations.

Bots may be added to or removed from a given inventory area to handle changes in demand. For example, one or more bots may be directed by the control system to move from one inventory area to another inventory area to support an increase in demand in the first inventory area if the second inventory area has bots that are underutilized.

Embodiments of the method for robotic induction in a materials handling facility may be integrated with other materials handling techniques. For example, some orders or portions of orders may be fulfilled via a different picking and/or induction process; a stream of items from the different picking and/or induction process may be merged with the stream of items from the method prior to or during downstream processing.

Figure 8:
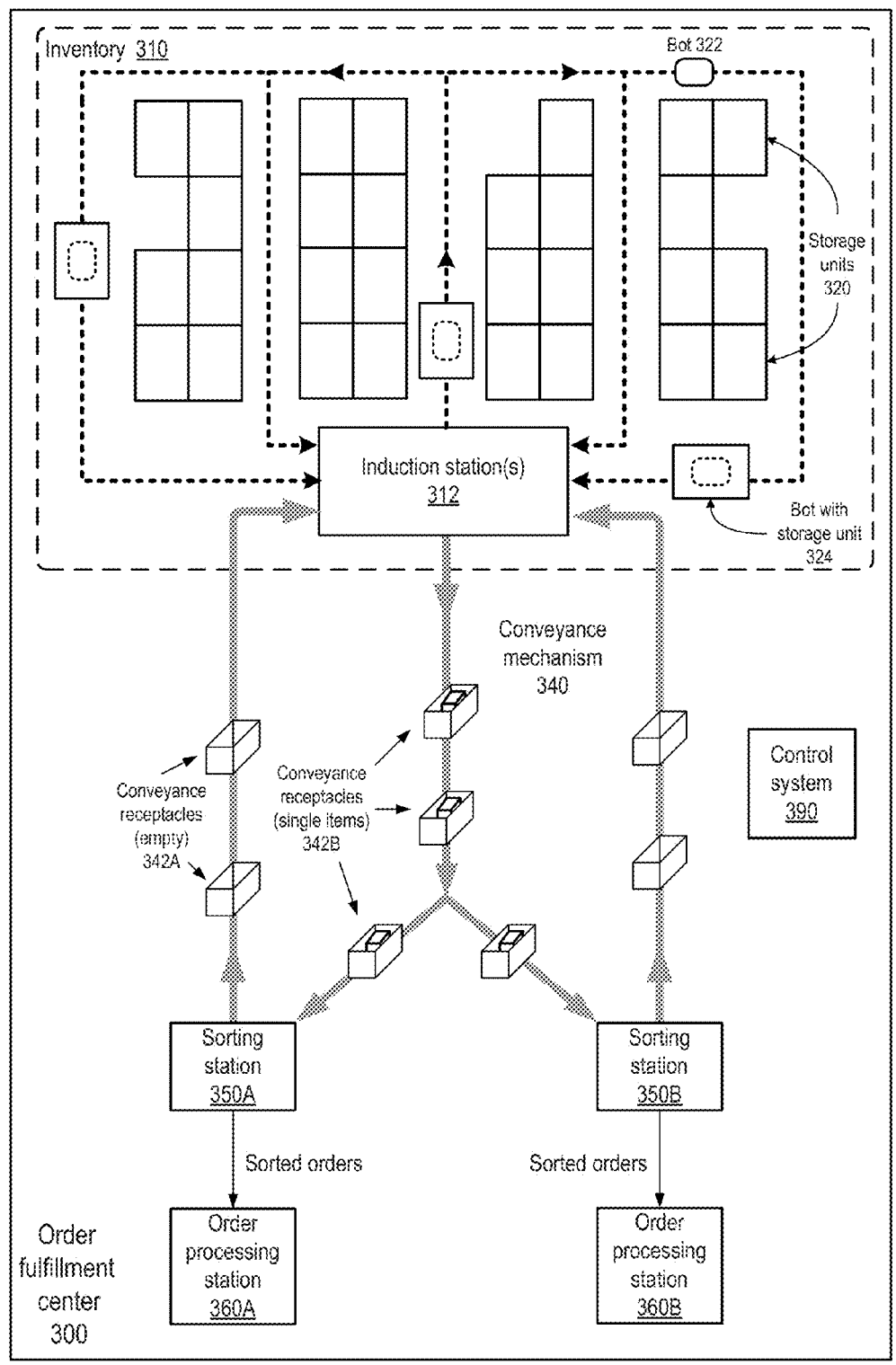
FIG. 8 illustrates an example physical layout of a materials handling facility, such as an order fulfillment facility or center, in which embodiments of the robotic induction technique as described herein may be implemented as part of a non-linear, unit-level materials handling system.
Figure 11:
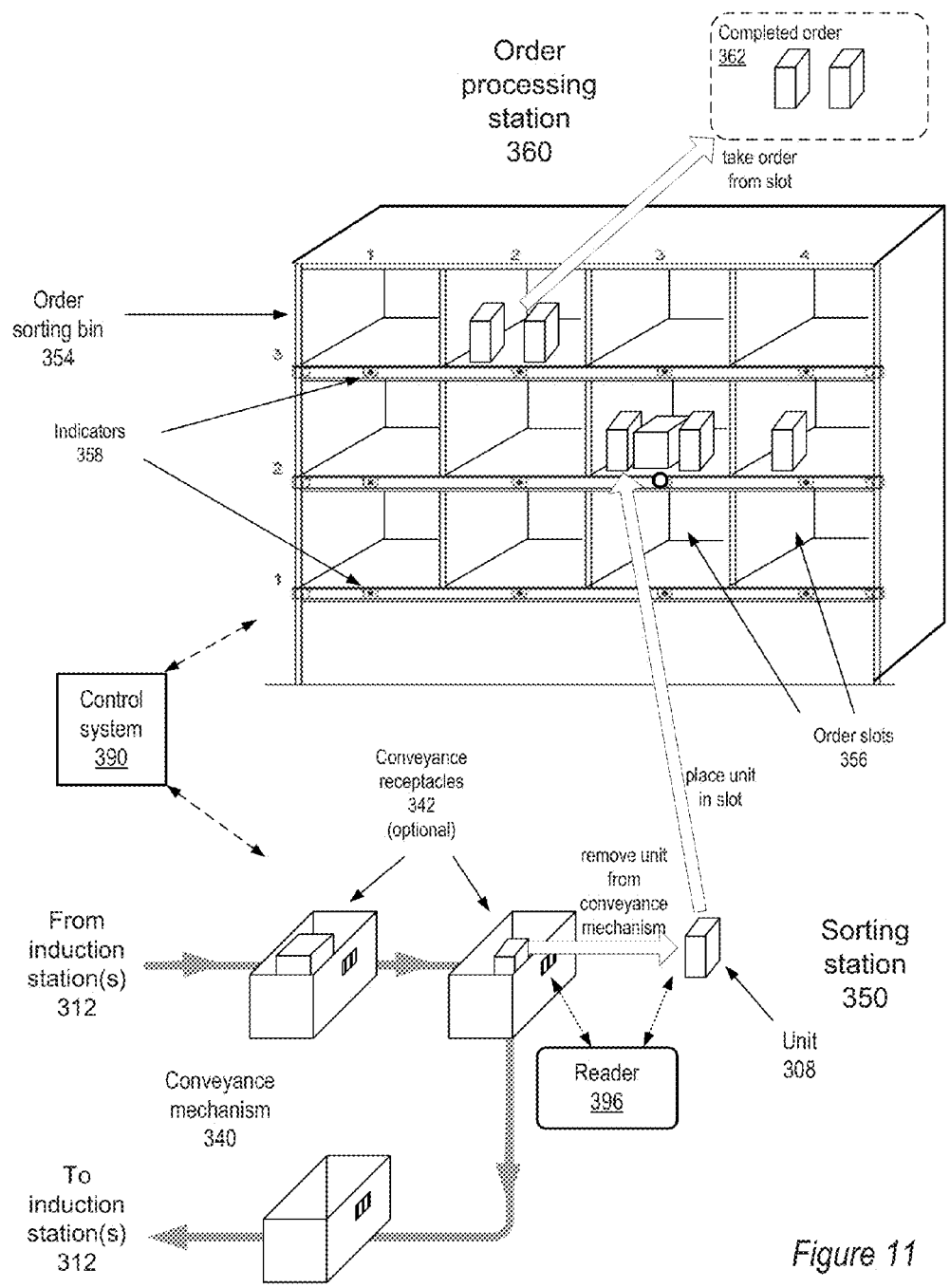
FIG. 11 illustrates operation of an example sorting station that may be used in embodiments of a non-linear, unit-level materials handling system.

Embodiments of the method for robotic induction in a materials handling facility may, for example, be implemented in a non-linear, unit-level materials handling system as illustrated in FIG. 8 that includes a sortation system that employs sorting stations as illustrated in FIG. 11. However, embodiments of the method for robotic induction in a materials handling facility may be implemented in other materials handling systems that employ other downstream processing techniques including but not limited to other downstream sorting techniques; the downstream sorting techniques may include automated sorting mechanisms and/or manual sorting systems.

FIG. 1 shows a logical representation or view of the operation of a materials handling facility in which embodiments of methods and apparatus for robotic induction in a materials handling facility may be implemented. For example, this Figure may illustrate an order fulfillment center of a product distributor. Multiple customers 10 may submit orders 20 to the product distributor, where each order 20 specifies one or more items from inventory 32 to be shipped to the customer that submitted the order. To fulfill the customers' orders 20, the items specified in the orders 20 may be retrieved, or picked, from inventory 32 (which may also be referred to as stock storage) in the materials handling facility according to a picking process 30 as described herein. In the picking process 30, under direction of a control system, storage units, each storing one or more units of one or more types of items, may be automatically moved from inventory 32 to particular induction stations, for example using robotic devices that can pick up and move storage units under direction of the control system. At the induction stations, singulating induction 34 is performed, manually or automatically, under direction of the control system. In the singulating induction process 34, at an induction station, individual units of items are removed from one or more locations on a given storage unit, delivered to the induction station by a robotic device (referred to herein as a "bot"), and the individual units of items are inducted into the conveyance mechanism.

In some embodiments, in the singulating induction process 34, the individual units of items may be placed into and associated with particular conveyance receptacles. Only one unit is placed in each conveyance receptacle. The conveyance receptacles are on, or are inducted into, the conveyance mechanism. In these implementations, the control system may track and direct the conveyance receptacles in the materials handling facility, for example using bar codes or other receptacle identifiers attached to or integrated in the receptacles and associated with the units of items contained therein, to track and direct the units of items associated with the conveyance receptacles. Receptacles, as used herein, may include, but are not limited to, any tote, basket, box, tray, or similar mechanism configured to receive individual units of items or batches of units of items in a materials handling facility. In at least some embodiments, the conveyance receptacles are not fixed to any conveyance mechanism, and thus conveyance receptacles can be added to or removed from a conveyance mechanism.

In some embodiments, instead of using conveyance receptacles in the singulating induction process 34, single units of items are removed from the storage units and place directly onto the conveyance mechanism. In these embodiments, the control system may directly track and direct the units of items on the conveyance mechanism. For example, in some implementations, each unit of item inducted into the conveyance mechanism may have a unique unit identifier associated with the particular unit, for example via a bar code, RFID tag, or other identifying mark or tag attached to or integrated with the unit of item. The control system may track and direct the units of items in the materials handling facility using the unit identifiers of the units of items. As another example, in some implementations, one or more physical characteristics of the items may be used to track and direct the units of items. For example, the materials handling facility may include cameras coupled to the control system whereby the control system visually identifies, tracks, and directs the individual units of items according to identifiable visual characteristics of the items.

A type of item held in inventory 32 may be referred to herein as simply an item. The term unit may be used to refer to one instance of a type of item. However, cases, boxes, bundles, or other collections of instances of items may be considered as units. The units of items in a collection may all be of the same type of item, for example a case of 12 instances of a particular item, or may be a collection of one or more instances of each of two or more heterogeneous items. A collection of instances of item(s) (e.g., a case containing 12 instances of an item, or a bundle containing one or more instances of each of two or more heterogeneous items, such as a boxed or bundled set of three different books) may thus be considered or treated as a "unit" in the order fulfillment process. Thus, at induction stations, in addition to singulating and inducting individual instances of items, collections of instances of item(s) designated as units may be singulated and inducted. Therefore, collections of instances of item(s) that are designated as units may be singulated and inducted into the conveyance mechanism at the induction stations as well as individual instances of items.

When an induction station is done with a particular storage unit, the storage unit may be automatically returned from the induction station to inventory 32, for example using a robotic device. A next storage unit, which may be staged nearby, may then be moved into place at the induction station so that units may be selected from the storage unit and inducted into the conveyance mechanism.

The singulated and inducted units of items may be conveyed, by the conveyance mechanism to one or more stations in the materials handling facility for downstream processing, for example sorting 50 into their respective orders, packing 60, and finally shipping 70 to the customers 10. In downstream processing, the units of items may be routed to particular destinations for the units of items in accordance with the requests (orders) currently being processed, for example to sorting stations or to packing stations, under direction of the control system. An example sorting process and sorting station that may be a destination for the units of items is described later in this document.

Note that a picked, packed and shipped order does not necessarily include all of the items ordered by the customer 10; an outgoing shipment to a customer 10 may include only a subset of the ordered items available to ship at one time from one inventory-storing location.

A materials handling facility may also include a receiving 80 operation for receiving shipments of stock from one or more sources (e.g., vendors) and for stowing the received stock into stock storage (inventory 32). The receiving 80 operation may also receive and process returned purchased or rented items or orders from customers. At least some of these returned items are typically returned to inventory 32.

In at least some embodiments, rather than stowing directly to inventory 32 as shown in FIG. 1, received inventory may be delivered to one or more stowing stations (not shown). Under direction of the control system, storage units may be automatically moved from inventory 32 to particular stowing stations, for example using the robotic devices. At the stowing station(s), the received inventory may be manually or automatically placed in locations on the storage units under direction of the control system. The storage units are then returned from the stowing station(s) to inventory 32, for example using the robotic devices. In some embodiments, induction and stowing may be combined at one station so that individual items for orders can be inducted into the conveyance mechanism from storage units for delivery to one or more downstream processing stations (e.g., sorting stations) and received items can be stowed to the same storage units prior to the storage units being returned to inventory 32; storage units may also be moved from inventory 32 to the induction/stowing station(s) specifically for stowing.

The various operations of a materials handling facility may be located in one building, or alternatively may be spread or subdivided across two or more buildings. In addition, a materials handling facility may include one or multiple levels or floors. For example, a materials handling facility that includes inventory 32 may include one, two, or more levels; in multi-level facilities, inventory 32 may be spread across two or more levels. The total floor space of a materials handling facility may be anywhere from tens of thousands of square feet to more than a million square feet, although embodiments may be implemented in smaller facilities.

Figure 2A:
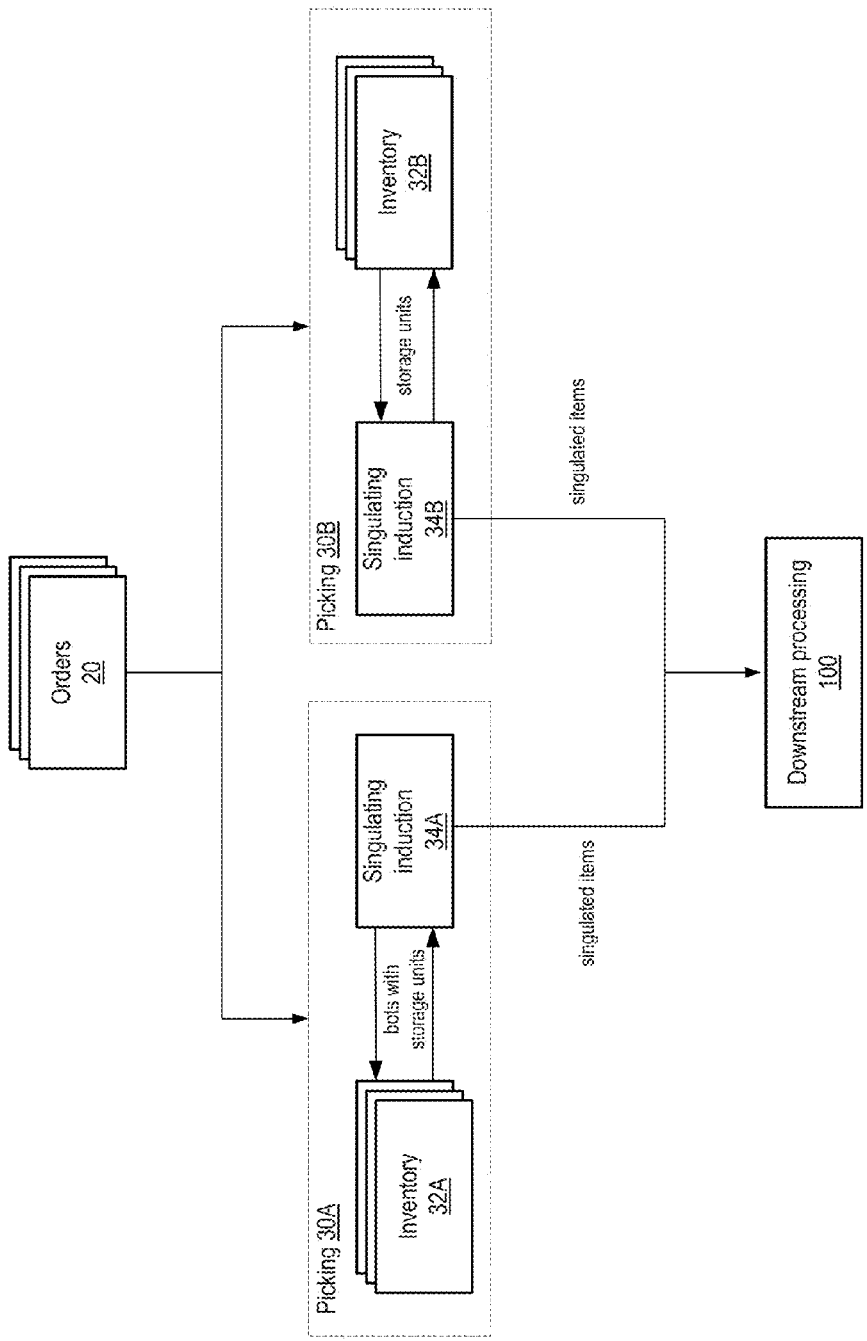
FIG. 2A shows a logical representation or view of the operation of a materials handling facility that includes two separate inventory areas in which the picking process including robotic induction is implemented.

The picking process 30 as illustrated in FIG. 1 may be implemented in two or more different inventory areas, for example on different floors or in different areas of a materials handling facility. FIG. 2A shows a logical representation or view of the operation of a materials handling facility that includes two separate inventory areas in which the picking process including robotic induction is implemented. Two or more separate stock storage areas may be maintained, for example inventory 32A and inventory 32B. For example, the separate stock storage areas may be located on different floors of a materials handling facility. For each separate stock storage area, there may be one or more associated induction stations. Types of items may be, but are not necessarily, stored in different stock storage areas. For example, units of a given type of item may be stowed to locations in storage units in both inventory 32A and inventory 32B.

To fulfill the customer orders 20, a portion of the orders 20, or parts of orders 20, may be directed to the picking process in each stock storage area (picking 30A and 30B, in this example) by the control system. Picking process 30A and 30B may operate as described above for picking process 30 in reference to FIG. 1. In at least some implementations, the stream of units of items that are singulated and inducted according to picking process 30A may be combined with the stream of units of items that are singulated and inducted according to picking process 30B prior to downstream processing 100.

Figure 2B:
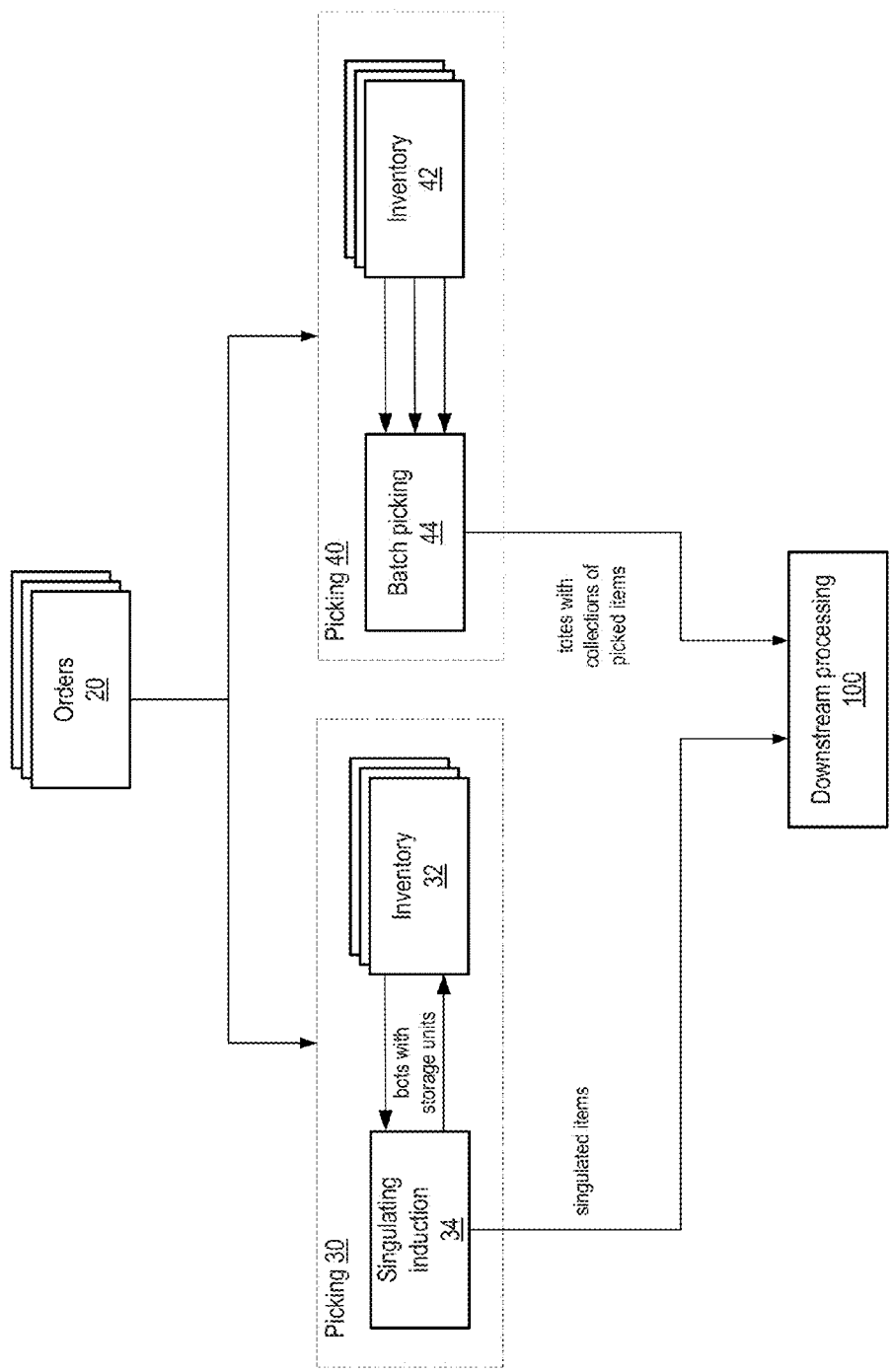
FIG. 2B shows a logical representation or view of the operation of a materials handling facility in which the picking process including robotic induction is used in combination with another, different picking process.

The picking process 30 as illustrated in FIG. 1 may be used in combination with other picking processes. FIG. 2B shows a logical representation or view of the operation of a materials handling facility in which the picking process is used in combination with another, different picking process. Two or more separate stock storages may be maintained, for example inventory 32 and inventory 42. Picking process 30 may operate as described above in reference to FIG. 1. Referring to FIG. 2B, to fulfill the customer orders 20, a portion of the orders 20, or parts of orders 20, may be directed to different picking process 40 from inventory 42 under direction of the control system. In an example picking process 40 that may be used in some implementations, collections of items specified in the orders 20 may be directly retrieved or picked from inventory 42 in the materials handling facility and placed into pick totes and/or pick carts as indicated at 44, by pickers under direction of the control system. For example, pick totes may be used in a picking method in which multiple pickers pick the same batch. In this picking method, the pickers may carry or otherwise convey pick receptacles, referred to as totes, in inventory 42 area into which the picked items are placed; heterogeneous units of items for different orders may be placed into the same pick tote. Alternatively, pick carts may be used in a picking method in which a single picker picks an entire batch. In this picking method, the pickers may convey pick carts in inventory 42 area into which the picked items are placed; heterogeneous units of items for different orders may be placed into the same pick cart. The pick totes and/or carts containing collections or batches of items picked according to picking process 40 may be delivered or conveyed to one or more stations in the materials handling facility for downstream processing 100, for example for sorting into their respective orders, packing, and shipping to the respective customers. The stream of units of items that are singulated and inducted according to picking process 30 may be combined with the stream of units of items picked according to the different picking process 40 during downstream processing 100; the combining of the two streams of picked items may occur prior to or at sorting, prior to or at packing, or prior to or at shipping. In some embodiments, to combine the two streams prior to or during downstream processing 100, the collections of units of items picked from inventory 42 in picking process 40 may be singulated and inducted into the conveyance mechanism to which the units of items are inducted in picking process 30, or into a separate conveyance mechanism. For example, in at least some implementations, the collections or batches of heterogeneous items picked according to picking process 40 may be delivered to a batch singulation station, where single units of items are selected from the collections or batches and inducted into the conveyance mechanism, under direction of the control system. In some implementations, the units of items selected from the batches may be associated with and placed in conveyance receptacles at the batch singulation station; the conveyance receptacles are inducted into the conveyance mechanism. In other implementations, the units of items selected from the batches may inducted directly into the conveyance mechanism at the batch singulation station.

Figure 3:
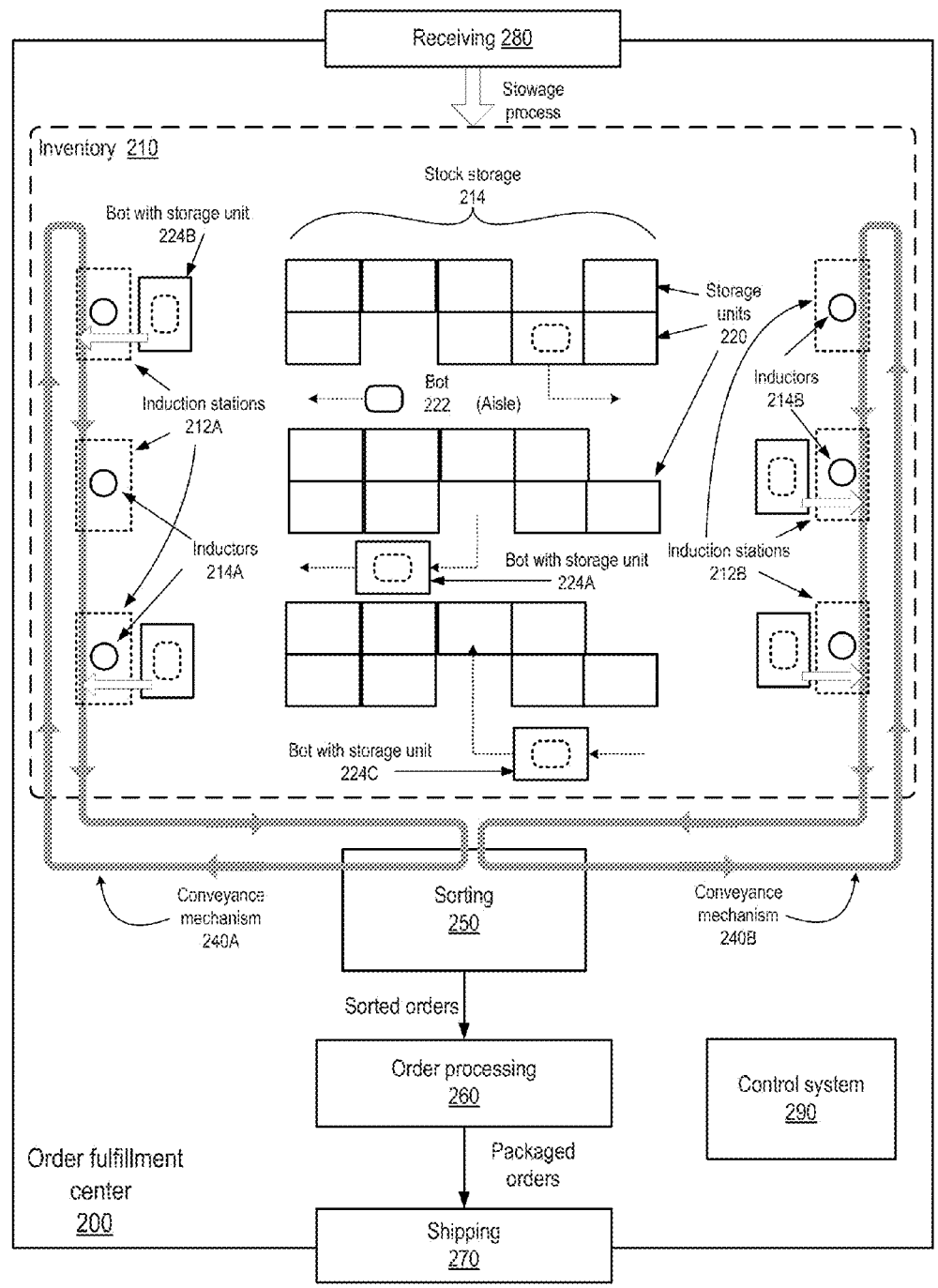
FIG. 3 illustrates an example of a physical layout of a materials handling facility, such as an order fulfillment facility or center, in which embodiments of the robotic induction technique may be implemented.

FIG. 3 illustrates an example of a physical layout of a materials handling facility, such as an order fulfillment facility or center, in which embodiments of the robotic induction technique may be implemented. The number, relative size, and arrangement of elements in FIG. 3 are given by way of example, and are not intended to be limiting. Order fulfillment center 200 may include one or more inventory 210 areas. Each inventory 210 area includes a stock storage 214 that includes a plurality of storage units 220. Each storage unit 220 may include one or more locations (e.g., slots, shelves, partitions, bins, etc.) in which units of items are stowed. Each storage unit 220 may stow one or more different types of items. Storage unit 220 may be arranged two-deep in rows of two or more, with aisles between the rows, as illustrated, or may be otherwise arranged.

Figure 10:
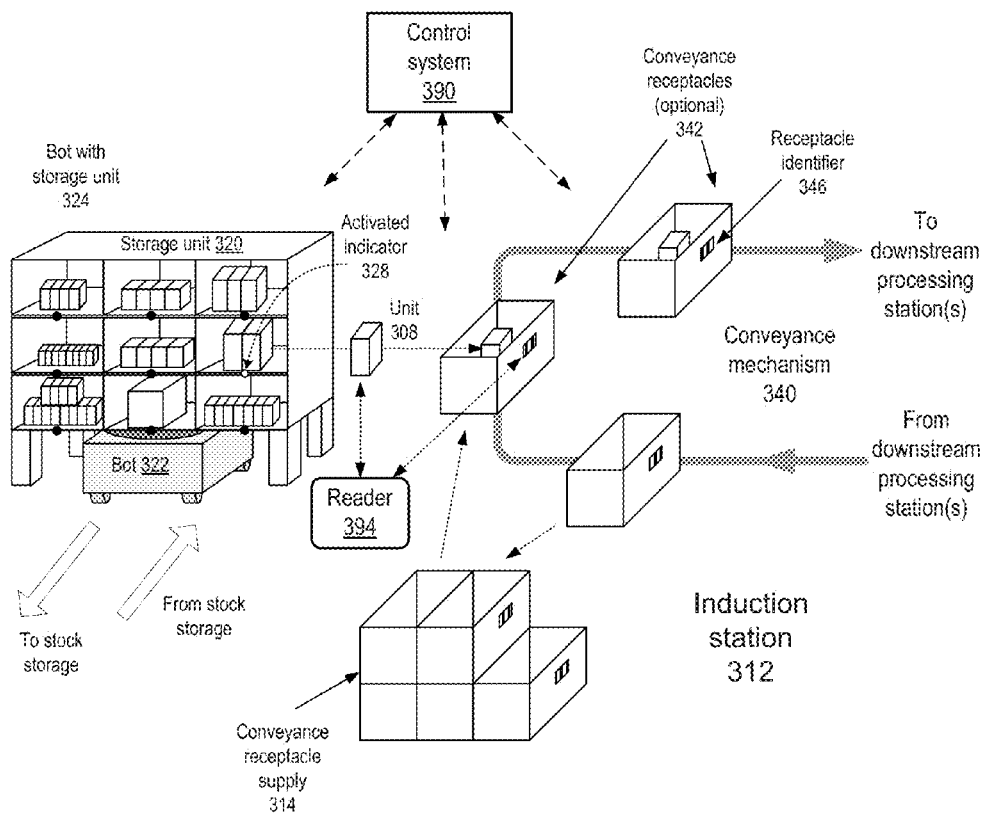
FIG. 10 illustrates operation of an example induction station according to at least some embodiments.

Each inventory 210 area also includes one or more induction stations 212. In this example, inventory 210 area includes six induction stations 212, with three induction stations arranged on each side of the stock storage 214 as induction stations 212A and induction stations 212B. A conveyance mechanism 240 passes through or by each induction station 212. FIG. 3 shows two separate conveyance mechanisms 240A and 240B, with conveyance mechanism 240A serving induction stations 212A and conveyance mechanism 240B serving induction stations 212B. In at least some implementations, a conveyance mechanism may form a loop that passes through inventory 210 area, and out to one or more downstream processing areas or stations, and then back to inventory 210 area. In this example, conveyance mechanisms 240A and 240B are shown as going from inventory 210 area to sorting 250, and from sorting 250 back to inventory 210 area. FIG. 10 illustrates operations at an example induction station 212.

At any one time, one or more bots 222 may be moving storage units 220 from stock storage 214 area to induction stations 212 to fulfill portions or all of one or more requests or orders, under direction of control system 290. In at least some embodiments, to move a storage unit 220, a bot 222 may move under the storage unit 220, lift the storage unit 220, and then move the storage unit 220 to a destination (e.g., a particular induction station 212) under direction of control system 290. FIG. 3 shows several examples of bots with storage units 224. For example, FIG. 3 shows bot with storage unit 224A moving from stock storage 214 towards an induction station 212A, bot with storage unit 224B at an induction station 212A, and bot with storage unit 224C moving from an induction station 212B to stock storage 214. FIGS. 5A and 5B illustrate an example bot, FIGS. 6A and 6B illustrate an example storage unit, and FIG. 7 illustrates an example bot with storage unit.

Figure 9:
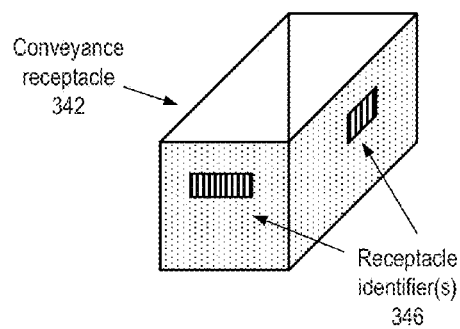
FIG. 9 illustrates an example conveyance receptacle, according to at least some embodiments.

At an induction station 212, in a singulation and induction process, an inductor 214 pulls units of items from locations on storage units 220, under direction of control system 290 and inducts the individual units of items into a conveyance mechanism 240. In some implementations, individual units of items are associated with and placed into particular conveyance receptacles on a conveyance mechanism 240 by the inductor 214, under direction of control system 290 (induction). A single unit is placed in each conveyance receptacle (singulation). FIG. 9 illustrates an example conveyance receptacle. In other implementations, the individual units of items may be inducted directly into a conveyance mechanism 240 without placing the units of items into a conveyance receptacle. An inductor 214 may be a human agent of the materials handling facility, or may be an automated mechanism controlled by control system 290.

In at least some embodiments, in addition to singulating and inducting units of items from storage units 220 moved to induction stations 212 by bots 222 under direction of control system 290, some types of items, for example fast-moving items, may be picked directly from inventory located at an induction station 212. For example, a pallet or other container containing units of a type of item may be delivered directly from receiving 280 or some other location to an induction station 212 by a bot 222 or by some other mechanism, and the inductor 214 may then pick units of the item directly from the container at the station 212 and induct the picked units into the conveyance mechanism 240, under direction of the control system 290.

The singulated and inducted units of items may then be delivered from inventory 210 area to a downstream processing station via the conveyance mechanism 240. During downstream processing, the units of items may be processed at a station, for example sorted into their respective orders at a sorting 250 station under direction of the control system 290. Once the processing of items for an order is completed at a station, the items may be delivered to another station for further processing, for example to another sorting station to be sorted into orders, or to a packing station to be packaged for shipping 270. In some implementations, units of items that are picked, singulated, and inducted for orders that specify multiple items may be routed by the control system 290 via a conveyance mechanism 240 to a sorting 250 station for sorting into their respective orders, while units of items that are picked, singulated, and inducted for orders that specify only that single unit of that item (i.e., single-item orders) may be routed by the control system 290 via a conveyance mechanism 240 directly to some other order processing station 260, such as a packing station.

In at least some embodiments, the conveyance mechanism(s) 240, under direction of control system 290, may deliver the singulated units of items from inventory 210 area to sorting 250. Sorting 250 may include one or more sorting stations where the units of items are removed from the conveyance mechanism(s) 240 and sorted into their respective orders under direction of control system 290. In at least some embodiments, conveyance mechanism 240 may deliver particular singulated units of items to particular sorting stations (or to other stations) under direction of control system 290. Operations of an example sorting station that may be used in some implementations is shown in FIG. 11. Sorted orders may be conveyed from sorting 250 station(s) to one or more other order processing 260 stations for additional processing prior to shipping 270. Note that portions of a given order may be received at a sorting 250 station or at an order processing station 260 at different times, so processing at a downstream processing station may have to wait for one or more items for some orders to be delivered to the station from another station before completion of processing of the orders at the station.

An order fulfillment center may also include one or more receiving 280 operations or areas for receiving shipments of stock from various vendors. Received stock may be placed into stock storage 214 in one or more inventory 250 areas. The receiving 280 operation may also receive and process returned, purchased, or rented items from customers. At least some of these items may be restocked into an inventory 250 area.

In at least some embodiments, rather than stowing directly to stock storage 314 as shown in FIG. 3, received inventory may be delivered to one or more stowing stations (not shown). Under direction of the control system 290, storage units 220 may be automatically moved from stock storage 214 to particular stowing stations, for example using the bots 222. At the stowing station(s), the received inventory may be manually or automatically placed in locations on the storage units 220 under direction of the control system 290. The storage units 214 are returned from the stowing station(s) to stock storage 314, for example using the bots 222. In some embodiments, induction and stowing may be combined at one or more of the induction stations 212 so that individual items for orders can be inducted into a conveyance mechanism 240 from storage units 220 for delivery to one or more downstream processing stations (e.g., sorting stations) and received items can be stowed to the same storage units 220 prior to the storage units 220 being returned to stock storage 214. Storage units 214 may also be moved from stock storage 214 to the induction/stowing station(s) specifically for stowing.

The various areas, operations and stations of an order fulfillment center 200 may be located in one building or facility, or alternatively may be spread or subdivided across two or more buildings or facilities. In addition, an order fulfillment center 200 may include one or multiple levels or floors. For example, an order fulfillment center 200 may include one, two, or more levels; in multi-level order fulfillment centers 200, a separate inventory 210 area may located on each of two or more levels, and various downstream processing stations may be located on one or more of the levels.

Figure 4:
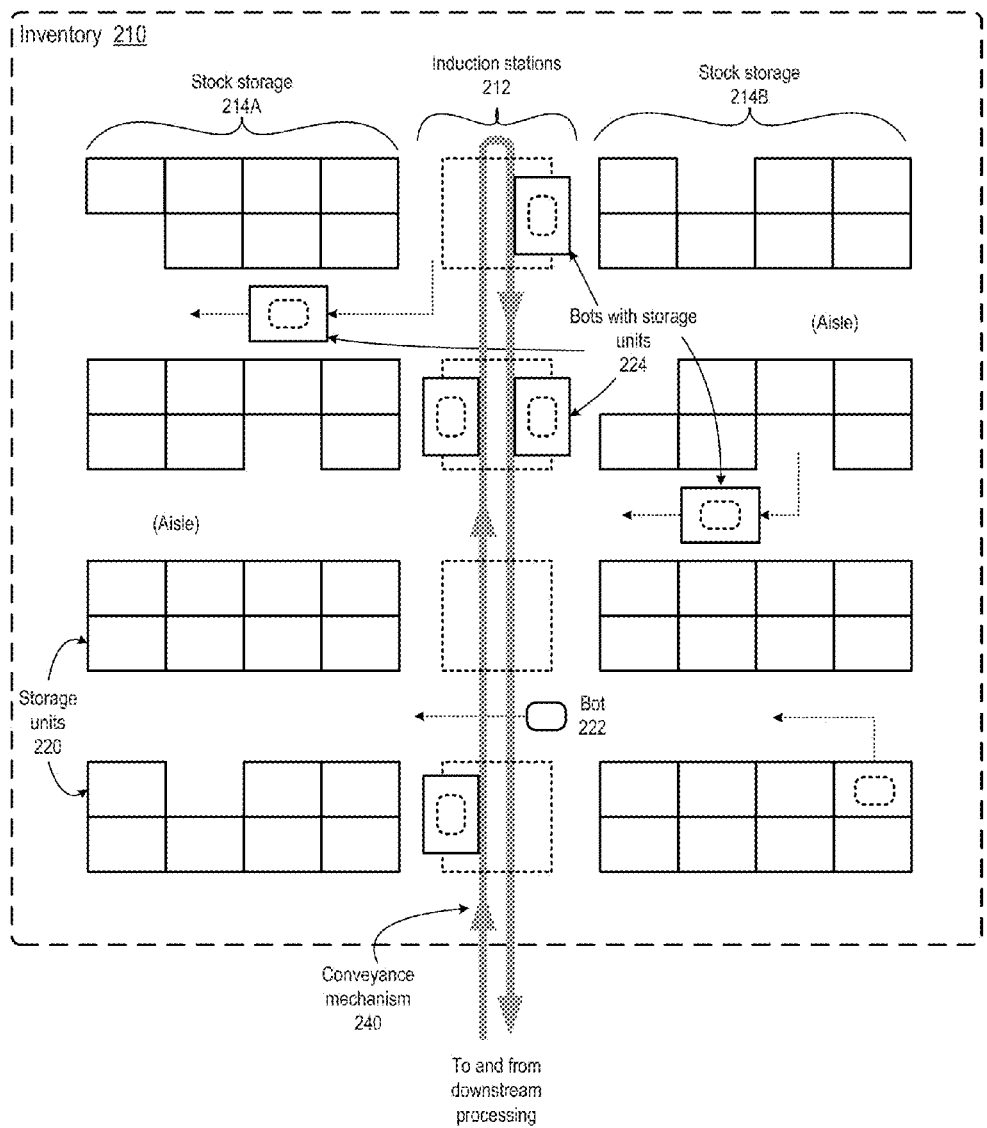
FIG. 4 shows an example inventory area in which there are two stock storage areas in an inventory area, with a row of induction stations between the stock storage areas, according to some embodiments.

The configuration of order fulfillment center 200, including the configuration of inventory 210 area and conveyance mechanism 240, as shown in FIG. 3 is given by way of example, and is not intended to be limiting. Other configurations for order fulfillment center 200, inventory 210 area, and conveyance mechanism(s) 240 are possible and contemplated. As an example, FIG. 4 shows an example inventory 210 area in which there are two stock storage areas (stock storage 214A and stock storage 214B) in an inventory 210 area, with a row of four induction stations 212 running down the middle of inventory 210 area between stock storage 214A and stock storage 214B, and with a single conveyance mechanism 240 serving all of the induction stations 212. As another example (not shown), an inventory area may include induction stations running down the middle of the inventory area as shown in FIG. 4, and also induction stations on the sides of the inventory area as shown in FIG. 3.

In addition, a materials handling facility may include two or more inventory 210 areas, which may be similarly or differently configured. A materials handling facility may, for example, have two or more levels, with a separate inventory 210 area located on at least two different levels. In these configurations, bots 222 may be directed, either automatically by control system 290 or by operator input to the control system 290, from one inventory 210 area to another inventory 210 area. For example when a first inventory 210 area has high demand and needs more bots 222, while a second inventory 210 area has less demand and can spare at least one bot 222, at least one bot 222 may be directed from the second inventory 210 area to the first inventory 210 area. In multi-level facilities, lifts may be provided to convey bots 222 between levels as necessary or desired. A bot 222 may be remotely directed, by the control system 290, to go to a lift, get on the lift, get off the lift at the appropriate level, and proceed to an inventory 210 area on the level. In at least some embodiments, as an alternative to directing the movement of bots 222 between inventory 210 areas to meet demand needs, control system 290 may instead direct picks from one inventory 210 area to another inventory 210 area or areas. For example, if the control system 290 detects that a particular inventory 210 area is falling behind, the control system 290 may shift some of the pick load to another inventory area 210.

In some implementations, an inventory 210 area may be subdivided into zones, for example a zone of the stock storage area corresponding to (and nearby) each induction station, and one or more bots may be assigned to operate within each zone. In these implementations, for example to handle differences in demand, bots 222 may be directed, either automatically by control system 290 or by operator input to the control system 290, from one zone to another zone in the inventory 210 area, or alternatively pick load may be directed from one zone to another zone in an inventory 210 area.

FIGS. 5A and 5B illustrate an example mobile robotic device (bot) that may be used in at least some embodiments. The shape, size, and configuration of the bot 222 and its components are examples for illustrative purposes, and are not intended to be limiting. FIG. 5A shows a top view of the example bot 222, and FIG. 5B shows a side view of the bot 222. A bot 222 may include at least a body or chassis, a lift mechanism located on top of the body for lifting storage units 220, and wheels (or other mechanisms such as tracks or treads) located underneath the body. While FIG. 5A shows a circular lift mechanism, the lift mechanism may be other shapes. While FIGS. 5A and 5B show a bot 222 with four wheels, a bot 222 may include more or fewer wheels, for example two rows of three wheels, three rows with four wheels in each row, and so on. Also, different wheels may have different functions; for example, one or more wheels may be drive wheels, one or more wheels may be steerable wheels, and one or more wheels may just be free-rolling wheels. In some implementations, a bot 222 may be configured to raise and lower the body relative to the wheels. In some implementations, a bot may not include a separate lift mechanism as shown in FIGS. 5A and 5B for lifting storage units 220; instead, raising and lowering the body relative to the wheels may act to lift and lower storage units 220.

A bot 222 may be short enough, with the lift mechanism lowered, to fit under storage units 220. In some embodiments, the bot 322 may be short enough to pass under other components of the materials handling facility, such as the conveyance mechanism 240 illustrated in FIG. 4. As shown in FIG. 5B, a bot 222 may include at least one drive motor for driving the wheels, at least one lift motor for raising and lowering the lift mechanism, communications and control components that may communicate (e.g., via wireless communications) with a control system 290 or other external devices and control motions and actions of the bot 222 under direction of the control system 290 and/or autonomously, and one or more sensors that may, for example sense the current location of the bot 222 in the materials handling facility and/or the location of the bot 222 relative to other external objects, devices, or stations in the materials handling facility. Communications and control components may include at least one computing device similar in architecture to the example computer system 900 illustrated in FIG. 11, which may store computer code and data for controlling the bot 222. The sensors may include optical sensors, tactile sensors, and/or other types of sensors. A bot 222 may also include at least one power supply and/or connection for connecting to an external power source. In some embodiments, the power supply may be or may include a rechargeable battery. A bot 222 may include other components, for example video cameras, audible alarms, external lights, access panels, external controls such as on/off buttons, antennas, and Radio Frequency Identifier (RFID) devices. For example, a bot 222 may include an RFID tag that uniquely identifies the bot 222 in the materials handling facility. However, other techniques or devices may be used to uniquely identify bots 222 in the materials handling facility.

A materials handling facility may include sensors, RFID readers, or other devices that enable the control system 290 to determine, and track the location of specific bots 222 in the facility via wired or wireless communications. A materials handling facility may also include transmitters or similar devices that enable the control system 290 to direct the motions and actions of specific bots 222. In some implementations, a materials handling facility may include guide strips, tracks, or other techniques for guiding the movements of the bots 222 in the facility, either autonomously or under control of the control system 290. For example, the aisles in the inventory 210 areas illustrated in FIGS. 3 and 4 may have guide strips embedded in or attached to the surface of the floor for guiding the bots 222.

In some implementations, a materials handling facility may use two or more different types or configurations of bots 222 for moving different types or configurations of storage units.

FIGS. 6A and 6B illustrate an example storage unit that may be used in at least some embodiments. FIG. 6A shows a front view of an example storage unit 220, and FIG. 6B shows a side view of the example storage unit 220 of FIG. 6A. A storage unit 220 may include one or more locations 226 into which units of items may be stowed. In some implementations, only one type of item is stowed in each location 226. However, implementations are possible in which two or more different types of items may be stowed in a location 226. FIG. 6A shows an example configuration for a storage unit 220 that may be used in some implementations, and is not intended to be limiting. Storage units 220 may have different configurations, and storage units 220 with different configurations may be used together in an implementation of an inventory 210 area. In various implementations, storage units 220 may have different numbers of locations, and/or different sizes of locations. In some implementations, a storage unit 220 may have two or more different sizes of locations to accommodate more or fewer items and/or larger or smaller items.

As shown in FIGS. 6A and 6B, a storage unit 220 may include legs that raise the bottom shelf of the unit 220 high enough so that a bot 222 can fit under the unit 220. This example shows four legs arranged at the corners of the unit 220; however, other numbers or configurations of legs are possible.

Each storage unit 220 may include at least one indicator 228 associated with each location 226 of the storage unit 220. An indicator 228 may, for example, be used to indicate, at an induction station 212, that a unit of an item is to be removed from that location 226 and placed in a conveyance receptacle, under control of control system 290. As another example, an indicator 228 may be used to indicate that a received item or items are to be placed in an indicated location 226, under control of control system 290, at an induction station 212 or at some other station. The indicator 228 may be a light, an audio signal, or some other mechanism or combination of mechanisms capable of conveying audible, visual, and/or other information to a human operator. As an alternative, or in addition, to indicators 228 physically located proximate to locations of storage unit 220, textual and/or graphical directions may be displayed on a monitor of a computer, hand-held device, etc., or printed to paper output for operator(s) at an induction station 212.

Each storage unit 220 may include at least one identifier 229, which may be attached to or integrated in a leg (as shown) or attached to or integrated in some other portion or surface of the unit 220. The identifier 229 may uniquely identify the unit 220 in an inventory 210 area, or in the materials handling facility. For example, a storage unit 220 may include an RFID tag that uniquely identifies the storage unit 220 in the materials handling facility. However, other techniques or devices may be used to uniquely identify storage units 220.

FIG. 7 illustrates an example bot with a storage unit, according to at least some embodiments. A bot 222, under control of control system 290, may move underneath a storage unit 290, and may raise the lift mechanism to lift the storage unit 220 off the floor. The bot 222 may then, under control of the control system and/or autonomously, move the storage unit 220 to another location, for example to a specific induction station 212 of an inventory 210 area. A bot 222 with a storage unit lifted, as illustrated in FIG. 7, may be referred to as a bot with storage unit 224.

FIG. 8 illustrates an example physical layout of a materials handling facility, such as an order fulfillment facility or center, in which embodiments of the robotic induction technique as described herein may be implemented as part of a non-linear, unit-level materials handling system. In an example conventional order fulfillment system, mixed batches of items are picked from inventory and delivered directly to a linear automated sorting mechanism; the individual items are inducted onto fixed carriers or trays on the automated sorting mechanism. In the example materials handling facility illustrated in FIG. 8, rather than picking mixed batches of items from inventory and delivering the picked batches of items directly to a linear automated sorting mechanism, in a materials handling facility, such as an order fulfillment facility or center, in which an embodiment of the robotic induction technique is implemented, one or more bots 322 move storage units 320 from stock storage area(s) to induction station(s) 312 to fulfill portions or all of one or more requests or orders, under direction of control system 390. At an induction station 312, an inductor pulls units of items from locations on storage units 320, under direction of control system 390. In this example physical materials handling facility, in the singulation and induction process, individual units of items are associated with and placed into particular conveyance receptacles (e.g., totes or trays) on a conveyance mechanism 340 by the inductor, under direction of control system 390 (induction). A single unit is placed in each conveyance receptacle (singulation). Note that, in other implementations, to perform singulation and induction, the inductors remove single units of items from the storage units 320 and place the single units of items directly onto the conveyance mechanism 340. An inductor may be a human agent of the materials handling facility, or may be an automated mechanism controlled by control system 390.

FIG. 9 illustrates an example conveyance receptacle, according to at least some embodiments. Receptacles, as used herein, may include, but are not limited to, any tote, basket, box, tray, or similar mechanism configured to receive individual units of items or batches of units of items in a materials handling facility. Conveyance receptacles 342 may come in a variety of sizes, shapes, volumes, and configurations. In at least some embodiments, conveyance receptacles 342 is not fixed to any conveyance mechanism, and thus conveyance receptacles 342 can be removed from or added to a given conveyance mechanism. Each conveyance receptacle 342 may be associated with or may include a unique conveyance receptacle identifier 346 that uniquely identifies the particular conveyance receptacle 342 in the materials handling facility. The conveyance receptacle identifier 346 may, for example, be indicated by a bar code, Radio Frequency Identifier (RFID) device, or some other scannable or readable mechanism, mark, or tag attached to or integrated with the conveyance receptacle 342. FIG. 9 illustrates conveyance receptacle 342 as including a receptacle identifier 346 attached to or integrated with the conveyance receptacle 342 at two locations. However, conveyance receptacles 342 may have one, two, or more receptacle identifiers 346 attached to or integrated with the receptacle 342. Receptacle identifiers 346 may be permanently fixed to conveyance receptacles 342 or, alternatively, may be attachable/removable.

In at least some embodiments, each unit of each type of item handled by the materials handling facility may include an item identifier. A type of item may be referred to herein as simply an item. The term item identifier refers to a unique identifier associated with each particular type of item handled by the materials handling facility. The term unit may be used to refer to one (unit) of a type of item. Typically, but not necessarily, each unit is tagged or otherwise marked with the item identifier. For example, units or collections of items in inventory may be marked or tagged with a bar code, Universal Product Code (UPC), Stock-Keeping Unit (SKU) code, serial number, and/or other designation (including proprietary designations) that may be used as item identifiers to facilitate materials handling facility operations, including, but not limited to, stowing, rebinning, picking, sorting, packing and shipping. These designations, or codes, may identify items by type, and/or may identify individual items (units) within a type of item. Thus, in some implementations, each unit of item inducted into the conveyance mechanism includes a unit identifier that uniquely identifies the unit of item within the materials handling facility. In some implementations, instead of inducting the units of items into conveyance receptacles 342, which are inducted into the conveyance mechanism 340, the units of items are inducted directly into the conveyance mechanism 340. The unique unit identifiers may then be used by the control system to track and direct the singulated units of items in the materials handling facility.

Cases, boxes, bundles, or other collections of units of items may similarly be marked or tagged with item identifiers. The units of items in a collection may all be of the same type of item, for example a case of 12 units of a particular item, or may be a collection of one or more units of each of two or more heterogeneous items. A collection of units of item(s) (e.g., a case containing 12 units of an item, or a bundle containing one or more units of each of two or more heterogeneous items, such as a boxed or bundled set of three different books) may thus be considered or treated as a "unit" in the order fulfillment process. A designation, or code, may thus also identify a collection of units of item(s) as a "unit" in the order fulfillment process. Thus, embodiments, in addition to processing individual units of items, may also process collections of units of item(s) designated as units. Therefore, collections of units of item(s) that are designated as units may be singulated and inducted into the conveyance mechanism at the induction stations as well as individual units of items.

In at least some embodiments that employ conveyance receptacles 342 as shown in FIG. 8, a unit of an item may be associated with the particular conveyance receptacle 342 it is placed in. In at least some embodiments, the association of a unit of an item with a particular conveyance receptacle 342 may be performed by reading, scanning or otherwise entering an item identifier associated with the item and a conveyance receptacle identifier 346 associated with the particular conveyance receptacle 342 into which the unit is placed. The item identifier and receptacle identifier 346 may be communicated to a control system 390 of the materials handling facility via wired and/or wireless communications. In at least some embodiments in which singulated units of items are inducted directly onto the conveyance mechanism 340 instead of into conveyance receptacles 342, the units of items may be associated with particular locations on the conveyance mechanism 340 into which the units are inducted. For example, in some embodiments, the association of a particular unit of an item with a particular location on conveyance mechanism 340 may be performed by reading, scanning or otherwise entering a unique unit identifier associated with the unit of the item and a location identifier associated with the location on the conveyance mechanism 340 into which the unit is placed. The unit identifier and location identifier may be communicated to a control system 390 of the materials handling facility via wired and/or wireless communications.

Figure 14:
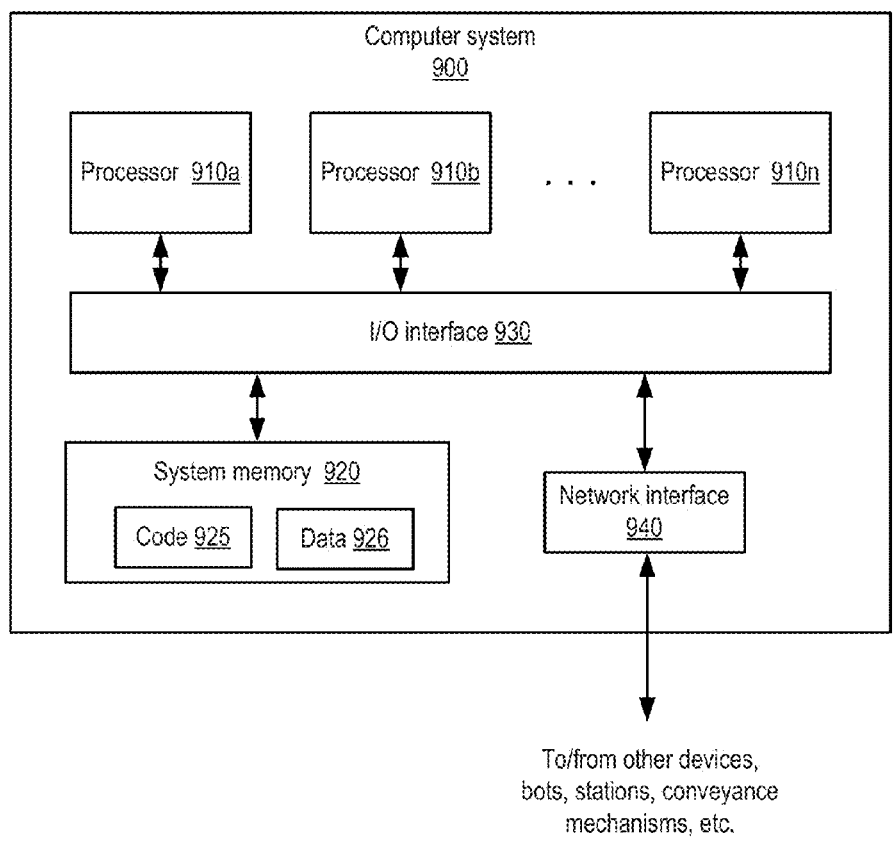
FIG. 14 is a block diagram illustrating an example computer system that may be used in at least some embodiments.

Referring again to FIG. 8, a materials handling facility (in this example, order fulfillment center 300) may include a control system 390 which may include, but is not limited to, one or more computer systems, one or more data storage devices, one or more wired and/or wireless networks, control system software (programs, modules, drivers, user interfaces, etc.), and one or more hand-held, mobile and/or fixed readers, scanners or scanning devices that may be able to scan, receive, or otherwise detect the marks or tags (e.g., bar codes, radio frequency identification (RFID) tags, etc.) on individual items (units) or collections of items (e.g., cases) and communicate with a control station or stations of the control system to, for example, determine and record the item and/or item type of the items. In addition, the hand-held, mobile and/or fixed readers, scanners or scanning devices may also be able to scan, receive, or otherwise detect the marks or tags (e.g., bar codes, radio frequency identification (RFID) tags, etc.) attached to or integrated with the conveyance receptacles 342. The control system 390 may also include one or more sensors, tracks, floor strips, or other mechanisms or components that may be used to direct the movements of bots 322 in an inventory 310 area or elsewhere within the facility. An example computer system that may be used in a control system 390 is illustrated in FIG. 14.

At an induction station 312, a unit of an item picked from a storage unit 320 delivered to the station by a bot 322 under direction of the control system 390 may be associated with a particular conveyance receptacle 342 by reading, scanning, etc. the item identifier associated with the item and the conveyance receptacle identifier associated with the conveyance receptacle 342 into the control system 390. This may be performed manually (e.g., by an operator using a hand-held scanner), via an automated scanning/reading process using fixed scanners/readers, or by a combination of manual and automatic scanning/reading. For example, an operator (inductor) at an induction station 312 may use a hand-held scanner to scan a code off the unit of the item before or during placement of the unit into a "staged" conveyance receptacle 342, while an automated reader may read (or may have already read) the conveyance receptacle identifier from the conveyance receptacle 342 that is "staged" for the operator to place the unit of the item into.

Once a unit of an item is associated with and placed into a particular conveyance receptacle 342, the conveyance receptacle 342 may be inducted into a conveyance mechanism 340 (e.g., a conveyor belt, roller system, or other conveyance mechanism) to be conveyed thereby to one or more downstream processing stations for further processing of the unit of the item. In various embodiments, the conveyance mechanism 340 may be a conveyance sorter mechanism that includes some method of diverting product off a conveyance path under control of control system 390. Examples of conveyance sorter mechanisms that may be used as conveyance mechanism 390 may include, but are not limited to, shoe sorter mechanisms, pop up sorter mechanisms such as pop up wheel sorter mechanisms, belt sorters, tray sorters, and so on. A pop up wheel sorter includes powered wheels that rise up out of the conveyor to divert product off the conveyor onto a different path or to a location. Other types of conveyance sorter mechanism may be used in various embodiments.

A conveyance receptacle 342 may already be on the conveyance mechanism 340 when the unit is associated with and placed into the receptacle 342. Alternatively, a conveyance receptacle 342 may be retrieved from a conveyance receptacle storage, stack, or other supply, the unit may be associated with and placed into the receptacle 342, and the receptacle 342 may then be inducted into or placed on the conveyance mechanism 340. In at least some embodiments, the conveyance receptacles 342 are not fixed to the conveyance mechanism 342; instead, the receptacles 342 are removable bins, trays, totes, or similar devices. The conveyance mechanism 340 may be coupled to and controlled by the materials handling facility control system 390 via wired and/or wireless communications. The control system 390 may receive input from and send commands to the conveyance mechanism 340 to direct or control various operations of the conveyance mechanism 340.

The above describes embodiments of an induction station 312 in which a human operator performs at least a portion of the pulling of units of items from locations on storage units 320 automatically delivered to the induction station 312 by bots under direction of control system 390, scanning/reading the units items and conveyance receptacles 342 to associate single units of items to particular conveyance receptacles 342, and placing the units into the conveyance receptacles 342. In alternative embodiments, some or all of the activities described as being performed by a human operator may be performed by automated mechanisms, which may be coupled to and under control of the materials handling facility control system 390.

Once the conveyance receptacles 342B, each containing an individual unit of an item and each associated with the item it contains, are inducted into the conveyance mechanism 340, the receptacles 342B may be conveyed or routed to any of one or more processing stations, to one or more of various types of sorting mechanisms or processes, to other locations in the materials handling facility, and so on. In at least some embodiments, the conveyance mechanism 340 may be directed by the control system 390 as to the routing of each particular conveyance receptacle 342B. Since each conveyance receptacle 342B is associated with the particular item it contains, the control system 390 may, by tracking the conveyance receptacle 342B via its unique conveyance receptacle identifier, route the particular item to an appropriate destination. In implementations in which the units of items are inducted directly into the conveyance mechanism 340, the control system 390 may, for example, track and route the inducted individual units of items via their unique unit identifiers, or by some other method such as visual identification of physical aspects of the units of items.

The control system 390 may also include or have access to information on the orders in the order processing stream: for example, which orders are in the process of being fulfilled, which orders have been picked, what items in what quantities are included on each order, and so on. By associating particular items associated with particular conveyance receptacles 342B via the conveyance receptacle identifiers with the orders being processed, the control system 390 may route conveyance receptacles 342B containing units of items for particular orders to appropriate destinations for the orders, or for portions of the orders (e.g., to a particular one of one or more sorting stations 350 where particular orders are collected and grouped to be passed on to packing stations, or to other types of stations such as gift wrapping stations where pre-packing processing may be performed on orders or portions of orders, or even on individual units of items). The routing of conveyance receptacles 342B and the particular items contained therein may be performed automatically (e.g., by directing the conveyance mechanism 340 to deliver a conveyance receptacle 342B to a particular destination) and/or by providing indications to human operators as to the routing or placement of conveyance receptacles 342B and/or the items contained therein. As an example of the former, a reader communicatively coupled to the control system 390 may automatically read the conveyance receptacle identifier from a receptacle 342B as it passes on the conveyance mechanism 340, and the control system 390 may then direct the conveyance mechanism 340 to route the receptacle 342B on a particular one of two or more paths or branches of the conveyance mechanism 340, for example to a branch that conveys the receptacle 342B to a particular processing station such as sorting station 350A or 350B. As an example of the latter, once a receptacle 342B is routed to and arrives at a processing station such as a sorting station 350A, the conveyance receptacle identifier may be manually or automatically scanned or read from the receptacle 342B, and the control system 390 may then activate an indicator on a particular slot, bin, shelf, etc. that is the correct destination for the item contained in the receptacle 342B. The indicator may be a light, an audio signal, or some other mechanism or combination of mechanisms capable of conveying audio, visual, and/or other information to a human operator. Alternatively, the indicator may be textual or graphical directions displayed on a monitor of a computer, hand-held device, etc., or printed to paper output.

Once the unit of an item has been pulled from its associated conveyance receptacle 342B at whatever destination the receptacle is routed to (e.g., a sorting station 350), the item and receptacle 342B may be disassociated by the control system 390. The empty (and unassociated) conveyance receptacle 340A may then be re-inducted, if necessary, into the conveyance mechanism 340 to be returned, e.g. to an induction station 312 (there may be more than one induction station 312; therefore, a receptacle 342A is not necessarily returned to the same induction station 312 it came from). However, an empty conveyance receptacle 342A is not necessarily immediately re-inducted into the conveyance mechanism 340 when emptied. The conveyance receptacles 342 are not fixed or attached to the conveyance mechanism 340, and there is no necessary ordering of the receptacles 342 on the conveyance mechanism 340; therefore, an emptied conveyance receptacle 342A may be removed and set aside if necessary or desired. When an empty conveyance receptacle 342A arrives at an induction station 312 by the return path of the conveyance mechanism 340, the conveyance receptacle 342A may be associated with and used to contain and convey a selected unit of an item from a storage unit 320 currently at the particular induction station 312, or alternatively may be set aside into a conveyance receptacle storage area or stack if necessary or desired. Again, the conveyance receptacles 342 are not fixed to the conveyance mechanism 340, and are not ordered on the conveyance mechanism 340. In other words, the conveyance mechanism 340, and thus the entire materials handling system, is non-linear.

The above describes a non-linear, unit-level materials handling system for sorting units of items for delivery to various destinations according to requests or orders and in which the items are picked according to a singulating and inducting, robot-assisted picking process. In the picking process, in a given inventory 310 area, bots 322 deliver storage units 320 from stock storage, each containing one or more types of items at one or more locations, to one or more induction stations 100 under direction of control system 390. At the induction stations 312, individual units of items are pulled from locations on the storage units 320, associated with particular conveyance receptacles 342, and placed into the receptacles 342, with one and only one unit per receptacle 342. The conveyance receptacles with items 342B are inducted into a conveyance mechanism 340 under the direction of control system 390 that, through various mechanisms, directs the receptacles 342B, each containing and associated with a single unit of an item, to particular destinations. One such destination, in some embodiments, is a sorting station 350, where the individual items may be manually or automatically retrieved from conveyance receptacles 342B and manually or automatically placed into slots or bins corresponding to particular orders. An example sorting station 350 is illustrated in FIG. 11. Empty conveyance receptacles 342A may be returned from the destinations to the one or more induction stations 312.

As noted above, the conveyance mechanism 340 is non-linear. The conveyance receptacles 342 are not fixed to the conveyance mechanism 340, and are not ordered on the conveyance mechanism 340. The conveyance mechanism 340 includes at least one conveyance path from the induction station(s) 312 in inventory area(s) 310 to one or more destinations to convey conveyance receptacles 342B each containing a single unit to the one or more destinations under direction of the control system 390. The conveyance mechanism 340 also includes at least one return path from at least one of the destinations to return empty conveyance receptacles 342A to the induction station(s) 312. Additional empty conveyance receptacles 342A may be inducted into the conveyance mechanism 340, for example to increase capacity of the non-linear, unit-level materials handling system. Empty conveyance receptacles 342A may be removed from the conveyance mechanism 340, for example to reduce capacity of the non-linear, unit-level materials handling system.

Thus, using the non-linear, unit-level materials handling system as described herein, conveyance receptacles 342 may be added to or removed from the conveyance mechanism 340 as necessary or desired, for example to dynamically adjust to changes in throughput. This may allow embodiments to achieve greater velocity and total throughput than, for example, fixed, linear tilt-tray sorting mechanisms, which have a fixed number of carriers that go around in a fixed, non-flexible loop. Further, the conveyance receptacles 340 may handle a wider variety of sizes and types of items than for example a fixed, linear tilt-tray sorting mechanism, with no lower limit on the size of items that can be placed in a receptacle 342, and the upper limit being the volume/dimensions of the receptacles 342 themselves. Further, different sizes of receptacles 342 may be inducted into the conveyance mechanism 340 as necessary or desired. Larger receptacles 342 may be used if there are a large number of bigger items being processed in the materials handling facility. Smaller receptacles 342 may be used if the materials handling facility handles mostly small items, which would allow the total number of receptacles 342 on the conveyance mechanism 340 at one time to be increased. The maximum number of receptacles 342 that can be on the conveyance mechanism 340 at one time is limited by the size of the receptacles 342; therefore, the use of smaller receptacles may allow more receptacles 342 to be on the conveyance mechanism 340 at one time. Further, a mix of different sizes and configurations of receptacles 342 may be used on the conveyance mechanism 340 at one time, unlike linear, fixed-receptacle sorting mechanisms that typically have one fixed size and configuration of carrier (e.g., tilt tray), which is fixed to the sorting mechanism. Further, if the requirements of the materials handling facility change, for example if the materials handling facility increases or decreases the average size of items carried in inventory, the non-linear, unit-level materials handling system may be adapted to handle the change simply, quickly and inexpensively by replacing some or all of the conveyance receptacles 342 and possibly making some other relatively inexpensive modifications, with little or no down time, rather than replacing or modifying entire linear, fixed-receptacle sorting mechanisms, which can be a very expensive and time-consuming process, and which might require significant down time.

As previously noted, in some implementations, rather than associating units of items with conveyance receptacles 342 and placing the units of items into the conveyance receptacles 342 as described for FIG. 8, the units of items may be directly inducted into the conveyance mechanism 340. In these implementations, the control system 390 may track and route the inducted individual units of items, for example via unique unit identifiers associated with the units or by some other method.

FIG. 10 illustrates operation of an example induction station according to at least some embodiments. Requests (e.g., orders) for items from requestors may be received at the materials handling facility. To fulfill the requests, a control system 390 may direct bots 322 in one or more inventory areas to retrieve storage units 320 that contain one or more of the requested items and to deliver the storage units 320 to particular induction stations 312. At an induction station 312, an inductor (which may be either a human agent or an automated device), under direction of control system 390, inducts individual units of items 308 into the conveyance mechanism 340. For example in implementations that employ conveyance receptacles 340, the inductor picks units 308 of one or more types of items from locations on the storage unit 320 and places each unit 308 of items into a pick receptacle 342. The unit 308 may be associated with a particular conveyance receptacle 342 and placed into the receptacle 342 (induction). One and only one unit 308 may be associated with and placed into each conveyance receptacle 342 (singulation). Alternatively, in some implementations, the units 308 may be directly inducted into the conveyance mechanism 340, as previously described.

Control system 390 may provide audible, visual, or other indications to human operators as to the selection of units 308 of items from storage units 320 and placing of the items into conveyance receptacles 342. For example, once a particular storage unit 320 arrives at an induction station 312, the control system 390 may be manually or automatically notified. The control system 390 may activate an indicator 328 associated with a particular location of the storage unit 320 to indicate that a unit 308 is to be removed from that location and placed in a next receptacle 342. The indicator 328 may be a light, an audio signal, or some other mechanism or combination of mechanisms capable of conveying audible, visual, and/or other information to a human operator. As an alternative, or in addition, to indicators 328 physically located proximate to locations of storage unit 320, textual and/or graphical directions may be displayed on a monitor of a computer, hand-held device, etc., or printed to paper output for operator(s) at induction station 312. After the unit 308 is associated with and placed in receptacle 342, the control system 390 may activate another indicator 328 on the storage unit 320 to indicate another location from which another unit of an item is to be pulled, or may direct the bot 322 to return the storage unit 320 to stock storage (or to take the storage unit 320 to another station), and may direct another bot 322 (or the same bot 322) to bring a next storage unit 320 to the induction station 312.

In at least some embodiments that employ conveyance receptacles 342, the association of a unit of an item 308 with a particular conveyance receptacle 342 may be performed by reading, scanning or otherwise entering an item identifier associated with the item and a unique conveyance receptacle identifier 346 associated with the particular conveyance receptacle 342 into which the unit 308 is placed. In at least some embodiments, a fixed, mobile, or hand-held reader 394 may be used to read or scan the item identifier and receptacle identifier 306. Associating a unit 308 of an item with a particular conveyance receptacle 304 may be performed manually (e.g., by a human operator using a hand-held scanner), via an automated scanning/reading process using fixed scanners/readers, or by a combination of manual and automatic scanning/reading. For example, an operator at the induction station 312 may use a hand-held scanner 394 to scan a code off the unit of the item 308 before or during placement of the unit 308 into a "staged" conveyance receptacle 342, while an automated reader may read (or may have already read) the conveyance receptacle identifier from the conveyance receptacle 342 that is "staged" for the operator to place the unit of the item into. The read or scanned item identifier and receptacle identifier 346 may be communicated to a control system 390 of the materials handling facility via wired and/or wireless communications. In at least some embodiments in which singulated units of items are inducted directly onto the conveyance mechanism 340 instead of into conveyance receptacles 342, the units of items may instead be associated with particular locations on the conveyance mechanism 340 into which the units are inducted.

In at least some embodiments that employ conveyance receptacles 342, once a unit of an item 308 is associated with and placed into a particular conveyance receptacle 342, the conveyance receptacle 342 may be inducted into conveyance mechanism 340 (e.g., a conveyor belt, roller system, or other conveyance mechanism) to be conveyed thereby to one or more downstream processing stations, for example sorting stations, for further processing of the unit of the item 308. For example, conveyance mechanism 340 may convey receptacles 342 containing units of items 308 to one or more sorting stations as illustrated in FIG. 11. Conveyance mechanism 340 may also return empty receptacles 342 from the downstream processing station(s). In at least some embodiments, the conveyance mechanism 340 may be a conveyance sorter mechanism that includes some method of diverting product off a conveyance path under control of control system 390. Examples of conveyance sorter mechanisms that may be used as conveyance mechanism 340 may include, but are not limited to, shoe sorter mechanisms, pop up sorter mechanisms such as pop up wheel sorter mechanisms, belt sorters, tray sorters, and so on. However, other mechanisms may be used as a conveyance mechanism 340.

In at least some embodiments that employ conveyance receptacles 342, the conveyance receptacle 342 may already be on the conveyance mechanism 340 when the unit 308 is associated with and placed into the receptacle 342. Alternatively, a conveyance receptacle 342 may be retrieved from a conveyance receptacle storage, stack, or other supply 314, a unit 308 may be associated with and placed into the receptacle 342, and the receptacle 342 may then be inducted into or placed on the conveyance mechanism 340. Once the conveyance receptacles 342, each containing an individual unit 308 of an item and each associated with the item it contains, are inducted into conveyance mechanism 340 at induction station 312, the receptacles 342 may be conveyed to any of one or more downstream processing stations, to one or more of various types of sorting mechanisms, to other locations in the materials handling facility, and so on. For example, conveyance receptacles 342 may be conveyed to a sorting station 350 as illustrated in FIG. 11.

The conveyance mechanism 340 may be coupled to and controlled by the materials handling facility control system 390 via wired and/or wireless communications. The control system 390 may receive input from and send commands to the conveyance mechanism 340 to direct or control various operations of the conveyance mechanism 340. The control system 390 may, for example, control conveyance mechanism 340 to direct a particular conveyance receptacle 342 and its associated unit 308 to a particular sorting station 350, as illustrated in FIG. 8. In implementations in which the units of items are inducted directly into the conveyance mechanism 340, the control system 390 may instead track and route the inducted individual units of items 308 via unique unit identifiers associated with the units 308, or by some other method such as visual identification of physical aspects of the units of items 308.

In some embodiments, a human operator may perform at least a portion of the operations at induction station 312 under direction of control system 390. In alternative embodiments, some or all of the operations may be performed by automated mechanisms, which may be coupled to and under control of control system 390.

In at least some embodiments that employ conveyance receptacles 342, empty conveyance receptacles 342 may be returned to induction station 312 from one or more locations in the materials handling facility (e.g., from one or more sorting stations 350) on conveyance mechanism 340. A supply 314 of conveyance receptacles 342 may be kept at or near induction station 312. Arriving receptacles 342 may remain on conveyance mechanism 312 to be used to receive, contain and convey units 308 of items or, alternatively, may be removed and placed into supply 314.

FIG. 11 illustrates operation of an example sorting station that may be used in embodiments of a non-linear, unit-level materials handling system. In at least some embodiments that employ conveyance receptacles 342, once the conveyance receptacles 342, each containing an individual unit 308 of an item and each associated with the item it contains, are inducted into the conveyance mechanism 340, for example at an induction station 312 as illustrated in FIG. 10, at least some of the receptacles 342 may be conveyed to sorting station 350. In at least some embodiments, the conveyance mechanism 340 may be directed by the control system 390 as to the disposition of each particular conveyance receptacle 342. Since each conveyance receptacle 342 is associated with the particular item it contains, the control system 390 may, by tracking a particular conveyance receptacle 342 via its unique conveyance receptacle identifier, direct the conveyance mechanism 340 to route the particular conveyance receptacle 342 and its associated unit of an item 308 to sorting station 350 from an originating induction station 312. In implementations in which the units of items are inducted directly into the conveyance mechanism 340, the control system 390 may instead track and route the inducted individual units of items 308 via unique unit identifiers associated with the units 308, or by some other method such as visual identification of physical aspects of the units of items 308.

To route a particular conveyance receptacle 342 or a unit 308 of an item to a particular destination, the control system 390 may also include or have access to information on the orders in the order processing stream: which orders are in the process of being fulfilled, which items for which orders have been picked and inducted at induction station(s) 312, what items in what quantities are included on each order, and so on. In at least some embodiments that employ conveyance receptacles 342, the control system 390 may associate a particular conveyance receptacle 342 including a unit 308 of a particular item with a particular order currently being processed in the order fulfillment process, and may route the conveyance receptacle 342 to an appropriate destination for the order (e.g., to sorting station 350 of FIG. 11). The routing of conveyance receptacles 342 may be performed automatically (e.g., by control system 390 directing the conveyance mechanism 340 to deliver a conveyance receptacle 342 to a particular destination). As an example, a reader communicatively coupled to the control system 390 may automatically read the conveyance receptacle identifier from a receptacle 342 as it passes the reader on the conveyance mechanism 340, and the control system 390 may then direct the conveyance mechanism 340 to route the receptacle 342 on a particular one of two or more paths or branches of the conveyance mechanism 340, for example to a path that conveys the receptacle 342 to sorting station 350. In implementations in which the units of items are inducted directly into the conveyance mechanism 340, the control system 390 may instead track and route the inducted individual units of items 308 via unique unit identifiers associated with the units 308, or by some other method such as visual identification of physical aspects of the units of items 308.

Control system 390 may also provide audible, visual, or other indications to human operators as to the routing or placement of conveyance receptacles 342 and/or the units 308 of items. For example, in at least some embodiments that employ conveyance receptacles 342, once a particular conveyance receptacle 342 arrives at sorting station 350, the conveyance receptacle identifier may be manually or automatically scanned or read from the receptacle 342 and communicated to control system 390. In at least some embodiments in which units of items 308 are inducted directly into the conveyance mechanism 340, once a particular unit 308 arrives at sorting station 350, the unique unit identifier of the unit 308 may be manually or automatically scanned or read from the unit 308 and communicated to control system 390. In at least some embodiments, a fixed, mobile, or hand-held reader 396 may be used to read or scan the conveyance receptacle identifier and/or the unit identifiers of units of items 308. After the conveyance receptacle identifier 306 or the unit identifier of the unit 308 is read, the control system 390 may activate an indicator 358 associated with a particular order slot 356 of an order sorting bin 354 located at the sorting station 350 that is assigned to an order that is associated with the unit 308 of the item. The indicator 358 may be a light, an audio signal, or some other mechanism or combination of mechanisms capable of conveying audible, visual, and/or other information to a human operator. As an alternative, or in addition, to indicators 358 physically located proximate to slots 356 on sorting bin 354, textual and/or graphical item placement directions may be displayed on a monitor of a computer, hand-held device, etc., or printed to paper output for operator(s) at sorting station 352.

There may be one or more order processing stations 360 associated with sorting station 352. In this example, an order processing station 360 is located on the other side of order sorting bin 354. An order processing station 360 may, for example, be a packing station at which one or more units 308 of items for an order are processed, packed, and labeled for shipping to the customer. The order slots 356 may be pass-through slots into one side of which units 308 of items may be placed by sorting 350, and out of which individual or collections of units 308 of items may be removed for processing by order processing 360. FIG. 11 shows an example single order sorting bin 354 at sorting station 350. However, there may be more than one order sorting bin 354 at a sorting station 350. For example, in some implementations there may be two order sorting bins 354, with one bin located on each side of sorting station 350, and with a separate order processing station 360 located on the opposite side of each bin 354.

FIG. 11 shows an example configuration for an order sorting bin 354 that may be used in some implementations, and is not intended to be limiting. Sorting bins 354 may have different configurations, and sorting bins 354 with different configurations may be used together in an implementation of a sorting station 350. In various implementations, sorting bins 354 may have different numbers of slots, and/or different sizes of slots. As examples, an order sorting bin 354 may have 112 6"×6" slots, or 32 12"×12"slots, or 24 12"×18" slots, or 24 16"×16" slots. A "hybrid" sorting bin 354 may have two or more different sizes of slots to accommodate larger or smaller orders and/or larger or smaller items; as an example, a hybrid order sorting bin 354 may include six 16"×16" slots, eight 12"×18" slots, eight 12"×12" slots, and 22 9"×9" slots. Note that these examples are not intended to be limiting.

In at least some embodiments, units 308 of items may be removed from conveyance mechanism 340 and placed into a particular slot 356 of an order sorting bin 354 as indicated by the control system 390, for example by the control system 390 activating an indicator 358 associated with the slot 356 into which the unit 308 is to be placed to indicate to the operator that the unit 308 from the current receptacle 342 is to be placed into that slot 356. For example, in FIG. 11, item 308 is illustrated as being placed into slot (row 3, column 2) of order sorting bin 354 as directed by control system 390 activating the indicator 358 for that slot 356. Sorting bin 354 may also include indicators associated with the slots 356 on the order processing station 360 side which control system 390 may activate to indicate to operators at the order processing station 360 that a particular slot 356 is ready to be processed (e.g., that all units 308 of all items for an order have been placed into that slot). In this example, control system 390 has indicated to operator(s) at order processing station 360 that an order 160 in slot (row 2, column 3) has been completed. An operator may then pull the order 362 from the indicated slot 356 for further processing.

In at least some implementations, a materials handling process using a control system 390, induction stations 312, sorting stations 350, and a conveyance mechanism 340 as described herein may free operators at sorting stations 350 from having to scan each individual item 308 during sorting. In at least some embodiments, the conveyance receptacle identifiers or unit identifiers of units 308 may be automatically read by a reader 396 as the receptacles 342 or units 308 approach or enter the location of sorting station 350 at which the operator removes units 308 from receptacles 342. The operator may thus simply remove a unit 308 from a receptacle 342 or directly from the conveyance mechanism 340, look to see which slot indicator 356 in a bin 354 is currently activated by control system 390, and place the unit 308 into the indicated slot 354.

In at least some embodiments that employ conveyance receptacles 342, once a unit 308 of an item has been pulled from its associated conveyance receptacle 342 at sorting station 350, the item 308 and receptacle 342 may be disassociated in the control system 390. The control system 390 may determine via the processing at sorting station 350, or alternatively may be informed via operator interaction with the control system 390, that the conveyance receptacle 342 is now empty. The empty (and unassociated) conveyance receptacle 342 may then be re-inducted, if necessary or desired, into the conveyance mechanism 340 to be returned, for example, to a induction station 312. There may be more than one induction station 312 in a materials handling facility; therefore, a receptacle 342 is not necessarily returned to the same induction station 312 that it originated from. However, a conveyance receptacle 342 is not necessarily immediately re-inducted into the conveyance mechanism 342 when emptied. The conveyance receptacles 342 are not fixed or attached to the conveyance mechanism 340, and there is no necessary ordering of the receptacles 342 on the conveyance mechanism 340; therefore, an emptied conveyance receptacle 342 may be removed and set aside if necessary or desired.

Figure 12:
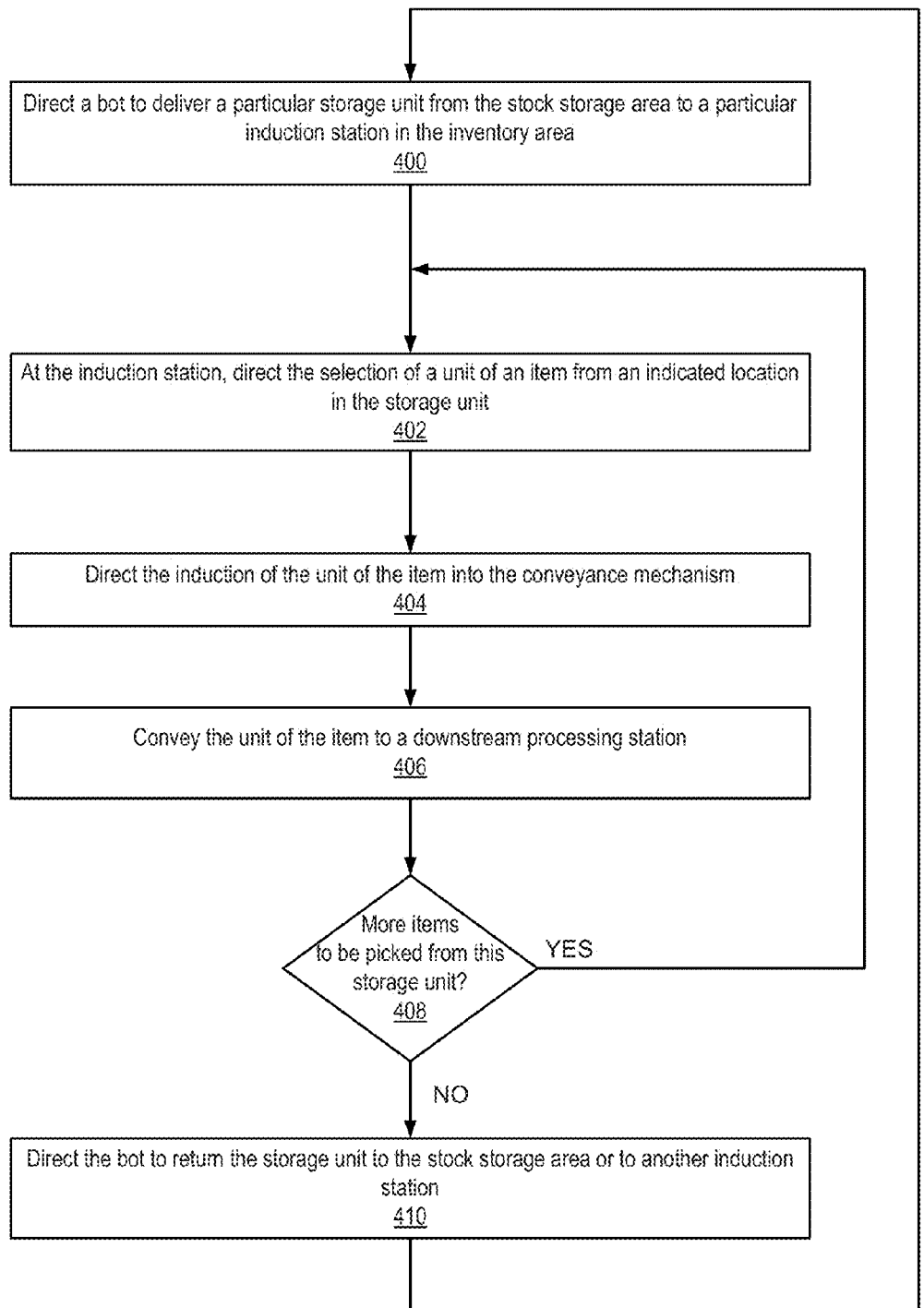
FIG. 12 is a flowchart illustrating a method for robotic induction in a materials handling facility, according to at least some embodiments.

FIG. 12 is a flowchart illustrating a method for robotic induction in a materials handling facility, according to at least some embodiments. As indicated at 400, a robotic device (bot) may be directed, for example by a control system of the materials handling facility, to deliver a particular storage unit from a stock storage area to a particular induction station in an inventory area. Example inventory areas with stock storage areas and induction stations are shown in FIGS. 3, 4, and 8. An example bot is shown in FIGS. 5A and 5B, an example storage unit is shown in FIGS. 6A and 6B, and an example bot with storage unit is shown in FIG. 7. An example induction station is shown in FIG. 10. An example computer system that may implement software components and functionality of the control system is illustrated in FIG. 14.

As indicated at 402, at the induction station, a unit of an item may be selected from an indicated location in the storage unit, under direction of the control system. As indicated at 404, the unit of the item may be inducted into a conveyance mechanism, under direction of the control system. In at least some embodiments that employ conveyance receptacles, an item identifier of the selected unit may be associated with a receptacle identifier of an empty conveyance receptacle. An example conveyance receptacle is illustrated in FIG. 9. The selected unit may be placed into the associated conveyance receptacle, and, the conveyance receptacle containing the unit may be inducted into the conveyance mechanism. Alternatively, the unit of the item may be inducted directly into the conveyance mechanism. As indicated at 406, the conveyance mechanism may convey the unit of the item to a downstream processing station, in at least some embodiments under direction of the control system to a particular one of two or more downstream processing stations. In some embodiments, the downstream processing station to which the unit of the item is directed may be one of one or more sorting stations as illustrated in FIG. 11.

At 408, if there are more items to be picked from this storage unit, the method may return to element 402 to process a next unit of an item. Note that the storage unit may store units of different types of items at different locations, and the next item picked from the storage unit may be another unit of the same type of item or a unit of a different type of item. Also note that the units of items picked from a storage unit may be for one order or for two or more different orders.

At 408, if there are not more items to be picked from this storage unit, the bot may be directed to return the storage unit to the stock storage area, or alternatively to another induction station, as indicated at 410. Another bot, or the same bot, may then be directed by the control system to deliver another storage unit to the induction station, as indicated by the return arrow from 410 to 400.

Note that there may be more than one induction station in an inventory area, and therefore the method as illustrated in FIG. 12 may be performed at each induction station. In addition, there may be more than one inventory area in a materials handling facility, and the method as illustrated in FIG. 12 may be performed in two or more of the inventory areas. At any one time in a given inventory area, different bots may be delivering different storage units to different induction stations, and/or returning storage units to stock storage or moving storage units from one induction station to another. In addition, while FIG. 12 indicates that a bot is not directed to deliver a storage unit to a given induction station until after a first bot has been directed to move a storage unit from the induction station, in at least some embodiments, one or more other bots may be directed to move storage units to a particular induction station while a storage unit is being processed at the station as indicated at 402 through 408 of FIG. 12. In at least some embodiments, a bot may hold a storage unit in a staging area while waiting for processing of the storage unit at the induction station to be completed and for the storage unit to be moved by its associated bot.

While not shown, in some implementations, received stock may be placed into a storage unit while the storage unit is at an induction station. In at least some embodiments, units or collections of one or more types of items received by a receiving process of the materials handling facility may be delivered to an induction station, and may be placed into one or more locations of the storage unit while it is at the station, under direction of the control system. Alternatively, an inventory area may have at least one stowing station to which bots deliver storage units for stowing of items to locations in the storage units under direction of the control system. The stowing process may be similar to the picking method shown in FIG. 12, but with units (or collections) being stowed to indicated locations, rather than picked from indicated locations.

Note that one or more of the elements of FIG. 12 may be performed by a human operator under direction of the materials handling facility control system, or alternatively may be performed by one or more automated mechanisms which may be coupled to (wirelessly or wired) and under control of the materials handling facility control system.

Figure 13:
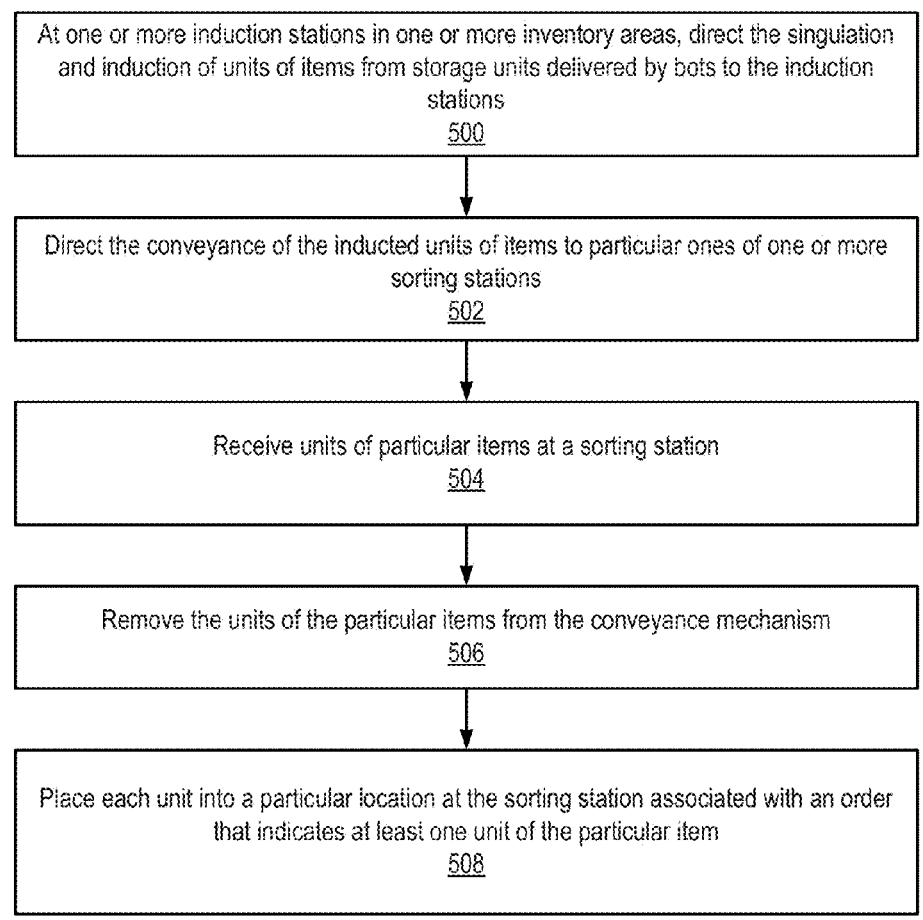
FIG. 13 is a flowchart illustrating a method of operation in a non-linear, unit-level materials handling system in which an embodiment of the robotic induction technique is implemented, according to at least some embodiments.

FIG. 13 is a flowchart illustrating a method of operation in a non-linear, unit-level materials handling system in which an embodiment of the robotic induction technique is implemented, according to at least some embodiments. This flowchart illustrates how the various components described herein, e.g. one or more induction stations, a conveyance mechanism, one or more sorting stations, and a control system, may be integrated to form a non-linear, unit-level materials handling system for handling the sortation of items to fulfill orders in the materials handling facility. The method as illustrated in FIG. 13 may be performed as a continuous or near-continuous process by the non-linear, unit-level materials handling system in the materials handling facility to sort a continuous or near-continuous incoming stream of heterogeneous items picked to fulfill orders into their respective orders.

Element 500 may be performed according to the method as illustrate in FIG. 12. Element 502 may be performed by a conveyance mechanism, such as conveyance mechanism illustrated in FIGS. 3, 4 and 8, which may be controlled by the control system. Elements 504 through 510 may be performed at a sorting station, such as the sorting station 152 illustrated in FIG. 11, under direction of the control system. An example computer system that may implement software components and functionality of the control system is illustrated in FIG. 14.

As indicated at 500, at one or more induction stations in one or more inventory areas, a control system may direct the singulation of units of items from storage units delivered by bots to the induction stations, and the induction of the units of items into a conveyance mechanism. In at least some embodiments that employ conveyance receptacles, singulation and induction may involve placing of the single units of items into conveyance receptacles on a conveyance mechanism. In a singulating induction process as illustrated in FIG. 13, at an induction station, individual units of items are removed from one or more locations on a given storage unit delivered to the induction station by a robotic device; the individual units may be placed into and associated with particular conveyance receptacles of a conveyance mechanism, or alternatively the individual units of items may be inducted directly into the conveyance mechanism.

As indicated at 502, the conveyance mechanism may convey the inducted units of items from the one or more induction stations of the one or more inventory areas to particular ones of one or more sorting stations in the materials handling facility. A particular unit of an item may be conveyed to a sorting station that is the destination for an order that specifies at least one unit of the item. A control system may direct the conveyance mechanism to route a particular unit of an item to the correct destination, e.g. to a sorting station at which an order specifying at least one unit of the item is to be collected for processing.

As indicated at 504, the inducted units of particular items may be received at a sorting station. At the sorting station, the units of particular items may be manually or automatically removed from the conveyance mechanism, as indicated at 506. In at least some embodiments that employ conveyance receptacles, the units of particular items may be manually or automatically removed from the conveyance receptacles. Each unit may then be manually or automatically placed into a particular location at the sorting station associated with an order that indicates at least one unit of the particular item, as indicated at 508. In at least some embodiments, the particular location may be a particular slot of an order sorting bin, such as the example order sorting bin illustrated in FIG. 11.

In at least some embodiments that employ conveyance receptacles, to place a unit into a particular location at the sorting station, the respective receptacle identifier may be manually or automatically read from the conveyance receptacle at or near the sorting station, and an indicator associated with the particular location may be automatically activated in response to reading the receptacle identifier to indicate to an operator that the unit of the particular item associated with the conveyance receptacle is to be placed into that particular location. In at least some embodiments in which units of items are inducted directly into the conveyance mechanism, to place a unit into a particular location at the sorting station, the respective unit identifier of the unit of the item may be manually or automatically read from the unit at or near the sorting station, and an indicator associated with the particular location may be automatically activated in response to reading the unit identifier to indicate to an operator that the unit of the particular item associated with the conveyance receptacle is to be placed into that particular location In at least some embodiments that employ conveyance receptacles, the empty conveyance receptacles may be, but are not necessarily inducted into a return path of the conveyance mechanism to return the conveyance receptacles to the induction station(s). The control system may direct the conveyance mechanism to return the empty conveyance receptacles to particular ones of the one or more induction stations, or alternatively may direct the conveyance system to route empty conveyance receptacles to some other destination. At an induction station, a returned empty conveyance receptacle may be associated with another item, receive a unit of the item selected from a storage unit at the station, and may then be conveyed by the conveyance mechanism to a sorting station under direction of the control system. Alternatively, empty conveyance receptacles may be removed from the conveyance mechanism at the sorting station(s), induction station(s), or at other locations along or destinations of the conveyance mechanism.

Illustrative System

In at least some embodiments, a system that implements one or more components of a robotic induction technique and/or of a non-linear, unit-level materials handling system that implements the robotic induction technique as described herein may include a general-purpose computer system that includes or is configured to access one or more computer-accessible media, such as computer system 900 illustrated in FIG. 14. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a control system in a robotic induction technique and/or in a non-linear, unit-level materials handling system that implements the robotic induction technique, are shown stored within system memory 920 as code 925 and data 926.

In at least some embodiments, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 800, such as other computer systems, communications devices, control mechanisms, readers, scanners and so on that are components of a robotic induction technique and/or of a non-linear, unit-level materials handling system that implements the robotic induction technique. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 12 for implementing a control system for, or possibly other components of, a robotic induction technique and/or of a non-linear, unit-level materials handling system that implements the robotic induction technique. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A unit-level materials handling facility, comprising:
   an inventory area comprising a plurality of portable storage units,
      wherein each portable storage unit of the plurality of portable storage units comprises one or more locations for stowing a first plurality of types of items in inventory, wherein the inventory area further comprises one or more induction stations, each induction station located proximate to a portion of a conveyance mechanism, and wherein the inventory area includes one or more mobile robotic devices operable to transport the portable storage units within the inventory area;
   a separate inventory storage area that stores a second plurality of types of items;
   a batch singulation station; and
   a control system operable to:
      direct the one or more robotic devices to transport, within the inventory area, a particular portable storage unit of the plurality of portable storage units to and from a particular induction station of the one or more induction stations within the inventory area;
      direct induction of one or more single units of items from one or more locations of the portable storage unit, while the particular portable storage unit is located at an induction station, into the conveyance mechanism at the particular induction station;
      direct picks of batches of heterogeneous items from the separate inventory storage area; and
      direct induction of single units of items from the batches of heterogeneous items picked from the separate inventory storage area into the conveyance mechanism at the batch singulation station.

2. The unit-level materials handling facility of claim 1, wherein the control system is operable to direct the conveyance of a stream of inducted single units of items from the one or more induction stations and a stream of inducted single units of items from the batch singulation station to one or more downstream processing stations via the conveyance mechanism.

3. The unit-level materials handling facility of claim 2, wherein the control system is operable to direct the merging of the stream of inducted single units of items from the one or more induction stations and the stream of inducted single units of items from the batch singulation station of items prior to or at a downstream processing station.

4. The unit-level materials handling facility of claim 3, wherein the downstream processing station is a sorting station.

5. The unit-level materials handling facility of claim 3, wherein the downstream processing station is a packing station.

6. The unit-level materials handling facility of claim 1, wherein the control system is operable to direct, to facilitate the induction, the placement of the one or more single units of items from one or more locations of the portable storage unit into conveyance receptacles and the induction of the conveyance receptacles containing the one or more single units of items into the conveyance mechanism.

7. The unit-level materials handling system of claim 1, wherein the conveyance mechanism is a conveyance sorter mechanism operable to divert items off a conveyance path under control of the control system.

8. A system, comprising:
   at least one processor; and
   a memory comprising program instructions, wherein the program instructions are executable by the at least one processor to:
      direct one or more robotic devices to transport a particular portable storage unit of a plurality of portable storage units to and from a particular induction station of one or more induction stations;
      direct induction of one or more single units of items from one or more locations of the particular portable storage unit, while the particular portable storage unit is located at the particular induction station, into a conveyance mechanism at the particular induction station;
      direct picks of batches of heterogeneous items from a separate inventory storage area; and
      direct induction of single units of items from the batches of heterogeneous items picked from the separate inventory storage area into the conveyance mechanism at a batch singulation station.

9. The system of claim 8, wherein the program instructions are further executable by the at least one processor to direct the conveyance of a stream of inducted single units of items from the one or more induction stations and a stream of inducted single units of items from the batch singulation station to one or more downstream processing stations via the conveyance mechanism.

10. The system of claim 9, wherein the program instructions are further executable by the at least one processor to direct the merging of the stream of inducted single units of items from the one or more induction stations and the stream of inducted single units of items from the batch singulation station prior to or at a downstream processing station.

11. The system of claim 9, wherein the program instructions are further executable by the at least one processor to direct the merging of the stream of inducted single units of items from the one or more induction stations and the stream of inducted single units of items from the batch singulation station at a sorting station.

12. The system of claim 9, wherein the program instructions are further executable by the at least one processor to direct the merging of the stream of inducted single units of items from the one or more induction stations and the stream of inducted single units of items from the batch singulation station at a packing station.

13. The system of claim 8, wherein the program instructions are further executable by the at least one processor to direct, to facilitate the induction, the placement of the one or more single units of items from one or more locations of the portable storage unit into conveyance receptacles and the induction of the conveyance receptacles containing the one or more single units of items into the conveyance mechanism.

14. The system of claim 8, wherein the program instructions are further executable by the at least one processor to direct the conveyance mechanism to operate a conveyance sorter mechanism for diverting items off a conveyance path under control of the control system.

15. A non-transitory computer-accessible storage medium storing program instructions computer-executable to implement a materials handling facility control system operable to:
   direct one or more robotic devices to transport a particular storage unit of a plurality of storage units to and from a particular induction station of one or more induction stations;
   direct induction of one or more single units of items from one or more locations of the particular portable storage unit, while the particular portable storage unit is located at the particular induction station, into the conveyance mechanism at the particular induction station;
   direct picks of batches of heterogeneous items from a separate inventory storage area; and
   direct induction of single units of items from the batches of heterogeneous items picked from the separate inventory storage area into the conveyance mechanism at a batch singulation station.

16. The non-transitory computer-accessible storage medium of claim 15, wherein the program instructions are further computer-executable to direct the conveyance of a stream of inducted single units of items from the one or more induction stations and a stream of inducted single units of items from the batch singulation station to one or more downstream processing stations via the conveyance mechanism.

17. The non-transitory computer-accessible storage medium of claim 16, wherein the program instructions are further computer-executable to direct the merging of the stream of inducted single units of items from the one or more induction stations and the stream of inducted single units of items from the batch singulation station prior to or at a downstream processing station.

18. The non-transitory computer-accessible storage medium of claim 16, wherein the program instructions are further computer-executable to direct the merging of the stream of inducted single units of items from the one or more induction stations and the stream of inducted single units of items from the batch singulation station at a sorting station.

19. The non-transitory computer-accessible storage medium of claim 16, wherein the program instructions are further computer-executable to direct the merging of the stream of inducted single units of items from the one or more induction stations and the stream of inducted single units of items from the batch singulation station at a packing station.

20. The non-transitory computer-accessible storage medium of claim 15, wherein the program instructions are further computer-executable to direct, to facilitate the induction, the placement of the one or more single units of items from one or more locations of the portable storage unit into conveyance receptacles and the induction of the conveyance receptacles containing the one or more single units of items into the conveyance mechanism.

* * * * *